United States Patent
Choi et al.

(10) Patent No.: US 9,734,183 B2
(45) Date of Patent: Aug. 15, 2017

(54) SYSTEM AND METHOD FOR PERFORMING VIEW UPDATES IN DATABASE SYSTEMS

(71) Applicant: Hong Kong Baptist University, Kowloon (HK)

(72) Inventors: Koon Kau Choi, Kowloon (HK); Yun Peng, Kowloon (HK)

(73) Assignee: Hong Kong Baptist University, Hong Kong (HK)

( * ) Notice: Subject to any disclaimer, the term of this patent is extended or adjusted under 35 U.S.C. 154(b) by 332 days.

(21) Appl. No.: 14/451,741

(22) Filed: Aug. 5, 2014

(65) Prior Publication Data
US 2015/0046499 A1 Feb. 12, 2015

Related U.S. Application Data

(60) Provisional application No. 61/863,448, filed on Aug. 8, 2013.

(51) Int. Cl.
*G06F 17/30* (2006.01)

(52) U.S. Cl.
CPC .. *G06F 17/30345* (2013.01); *G06F 17/30088* (2013.01); *G06F 17/30365* (2013.01); *G06F 17/30383* (2013.01)

(58) Field of Classification Search
CPC ......... G06F 17/30477; G06F 17/30424; G06F 17/24; G06F 17/30914; G06F 17/30345; G06F 17/30088; G06F 17/30365; G06F 17/30383; Y10S 707/99935; Y10S 707/99934

USPC .......................................................... 707/803
See application file for complete search history.

(56) References Cited

U.S. PATENT DOCUMENTS

| | | | | |
|---|---|---|---|---|
| 7,149,737 B1* | 12/2006 | Luo | ................... | G06F 17/30498 707/704 |
| 7,155,434 B1* | 12/2006 | Luo | ................... | G06F 17/30362 |
| 7,440,957 B1* | 10/2008 | Kotidis | ............. | G06F 17/30451 |
| 7,668,804 B1* | 2/2010 | El-Helw | ........... | G06F 17/30306 707/719 |
| 7,680,767 B2* | 3/2010 | Adya | ................. | G06F 17/30457 707/999.002 |
| 7,716,215 B2* | 5/2010 | Lohman | ............ | G06F 17/30979 707/721 |
| 8,151,248 B1* | 4/2012 | Butler | .................. | G06F 11/368 717/124 |
| 9,311,357 B2* | 4/2016 | Ramesh | ............ | G06F 17/30457 |
| 2002/0186241 A1* | 12/2002 | Kohda | .............. | G06F 17/30011 715/744 |
| 2003/0093408 A1* | 5/2003 | Brown | ............. | G06F 17/30336 |
| 2004/0236722 A1* | 11/2004 | Waas | .................. | G06F 17/3046 |
| 2004/0260675 A1* | 12/2004 | Bruno | ............... | G06F 17/30333 |
| 2005/0165866 A1* | 7/2005 | Bohannon | ......... | G06F 17/30483 |

(Continued)

*Primary Examiner* — Thanh-Ha Dang
(74) *Attorney, Agent, or Firm* — Renner Kenner Greive Bobak Taylor & Weber

(57) ABSTRACT

A method of data-oriented approach for performing view updates in database systems includes: processing one or more source databases of views to generate at least one summarization of the one or more source databases; utilizing the at least one summarization of the one or more source databases to determine one or more side effects associated with the view updates; and where upon the view updates have one or more side effects, preventing the view updates from being performed.

11 Claims, 24 Drawing Sheets

(56) References Cited

U.S. PATENT DOCUMENTS

| | | | |
|---|---|---|---|
| 2006/0085592 A1* | 4/2006 | Ganguly | G06F 17/30498 |
| | | | 711/114 |
| 2006/0253485 A1* | 11/2006 | Bangel | G06F 17/30578 |
| 2007/0174234 A1* | 7/2007 | Ramsey | G06F 17/30306 |
| 2008/0270489 A1* | 10/2008 | Kharatishvili | G06F 17/30457 |
| 2009/0177623 A1* | 7/2009 | Krishna | G06F 17/30442 |
| 2010/0049715 A1* | 2/2010 | Jacobsen | G06F 17/30575 |
| | | | 707/704 |
| 2012/0254245 A1* | 10/2012 | Foti | G06F 17/30498 |
| | | | 707/780 |

* cited by examiner

| Product (P) | |
|---|---|
| supplier | part |
| $p_1$ $S_3$ | $P_4$ |
| $p_2$ $S_4$ | $P_6$ |
| $p_3$ $S_1$ | $P_1$ |
| $p_4$ $S_2$ | $P_2$ |
| $p_5$ $S_5$ | $P_2$ |
| $p_6$ $S_6$ | $P_3$ |

| Supplier (S) | |
|---|---|
| supplier | location |
| $s_1$ $S_4$ | LA |
| $s_2$ $S_1$ | LA |
| $s_3$ $S_1$ | NY |
| $s_4$ $S_2$ | NY |
| $s_5$ $S_3$ | KS |

| Order (O) | |
|---|---|
| client | part |
| $o_1$ $C_3$ | $P_4$ |
| $o_2$ $C_3$ | $P_6$ |
| $o_3$ $C_1$ | $P_1$ |
| $o_4$ $C_2$ | $P_2$ |

| Agency (A) | |
|---|---|
| agent | part |
| $a_1$ $A_4$ | $P_1$ |
| $a_2$ $A_3$ | $P_2$ |
| $a_3$ $A_1$ | $P_3$ |

View $V = \pi_{supplier,location,part,client,agent}(S \bowtie P \bowtie O \bowtie A)$

| | supplier | location | part | client | agent |
|---|---|---|---|---|---|
| $v_1$ | $S_1$ | LA | $P_1$ | $C_1$ | $A_4$ |
| $v_2$ | $S_1$ | NY | $P_1$ | $C_1$ | $A_4$ |
| $v_3$ | $S_2$ | NY | $P_2$ | $C_2$ | $A_3$ | view updates:
$u_1$: insert $(S_4, FL, P_6, C_3, A_5)$
$u_2$: insert $(S_5, FL, P_6, C_3, A_4)$

Fig. 1

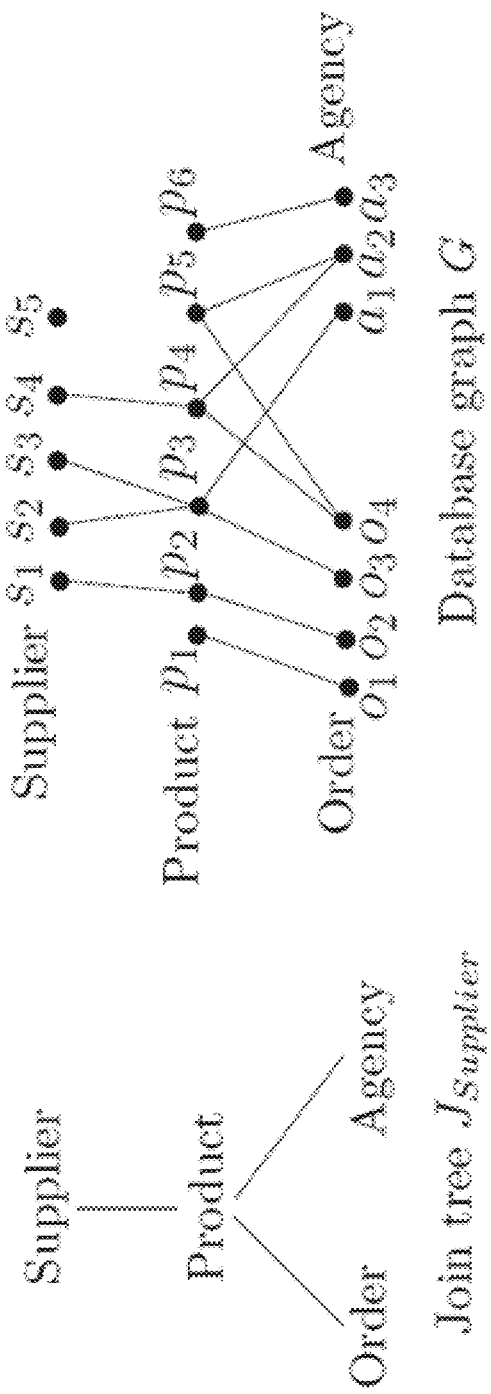

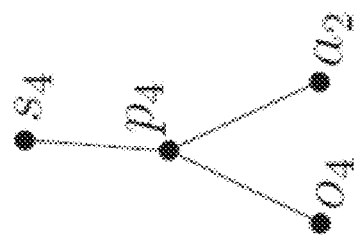
Fig. 3D Partial embedding
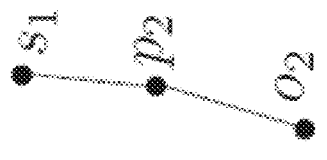
Fig. 3C Embedding

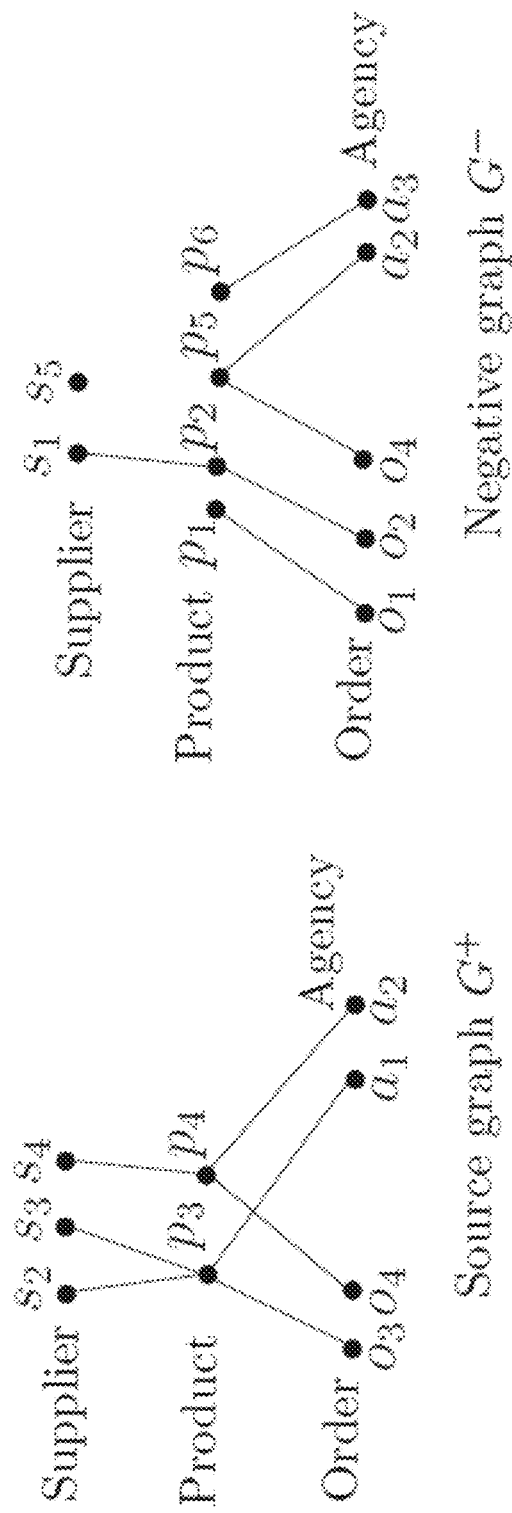

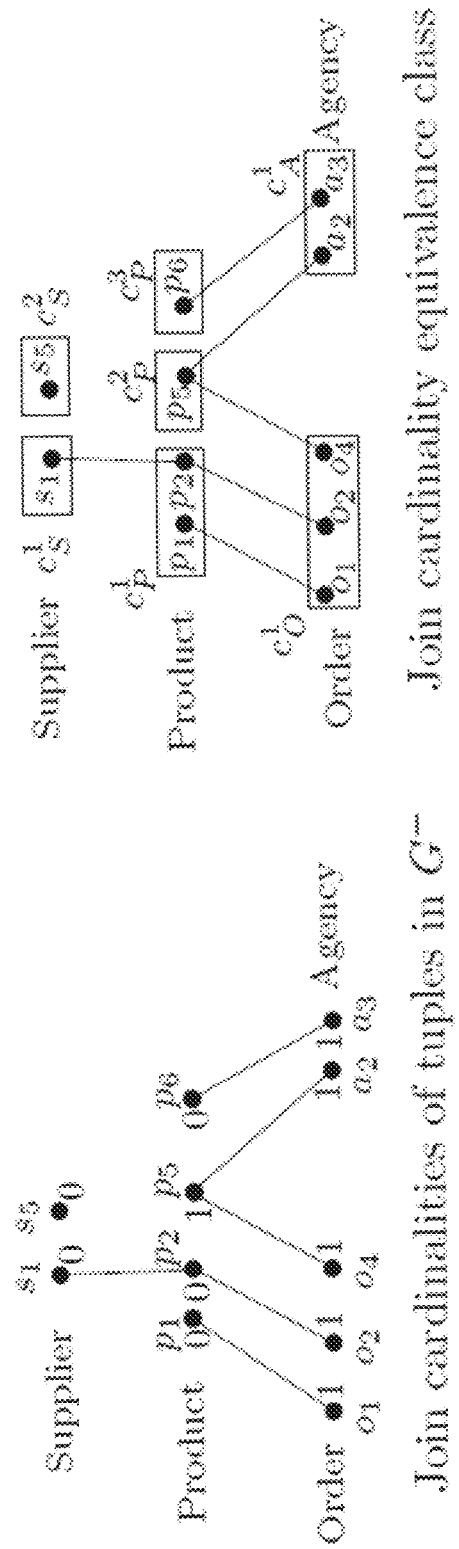

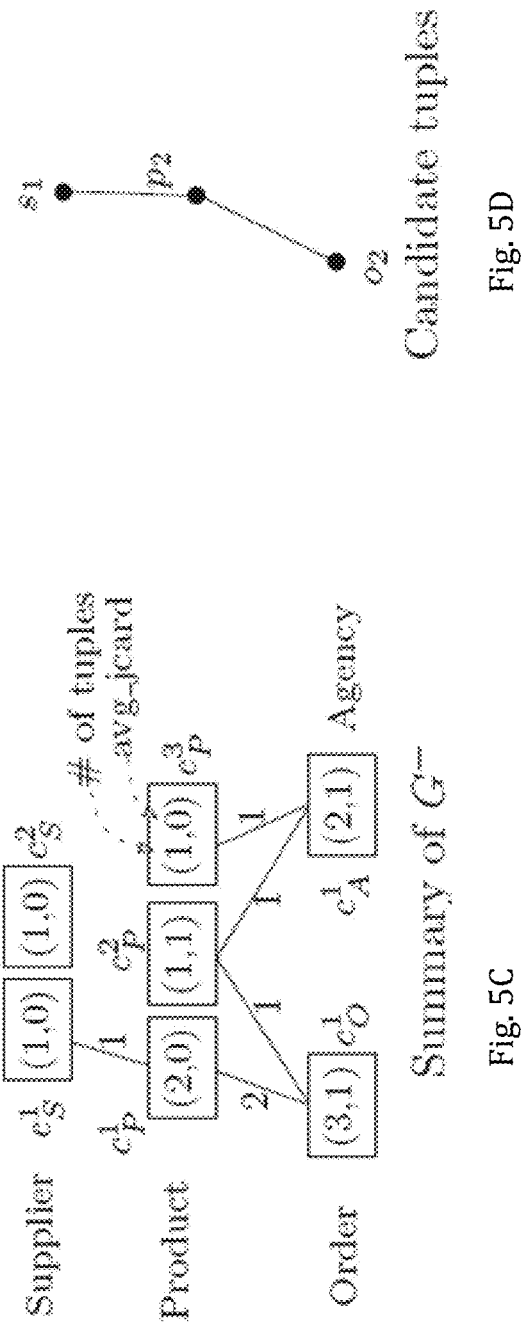

```
Procedure estimate_side_effects
Input: view tuple to-be-inserted t_v, join tree J_R of view.
       jCard G^- and error threshold θ
Output: true if it estimates side effects; false otherwise
01 C = decompose_view_tuple(t_v, J_R)
02 G^-' = update_equiv_class(J_R, G^-, C)
03 for each equivalence class c of the root relation R of J_R
04     propagate(c, G^-', J_R)
05 let C to be the classes of R that form embeddings with t_v
//let a denote the number of embeddings in G^- without ins.
06 return (∑_{c∈C}(c.est × |c|) − a > 1 + θ)
```

Fig. 6

Procedure propagate
Input: an equivalence class $c$, JCard $G^-$ and join tree $J_R$
Output: the estimated average jcard of tuples in $c.est$ 01 if $c$ is a leaf node in $G^-$
02    return $c.est = 1$
03 else //suppose $c$ is of relation $R'$ in $J_R$
04    for each child relation $R''$ of $R'$ in $J_R$
05      //let $c'$ denote a child of $c$ in $G^-$
06      for each $c$'s child $c'$ of $R''$
07        if $!c'.visited$ then propagate($c'$, $G^-$, $J_V$)
08        $c.est.R'' = \sum_{c'} \text{of } R''(c'.est \times |E_{c,c'}|/|c|)$
09    $c.est = \prod_{child\ R''\ of\ R'\ in\ J_R} (c.est.R'')$
10 return $c.est.R''$ of $R'$ in $J_R(c.est.R'')$

Fig. 7

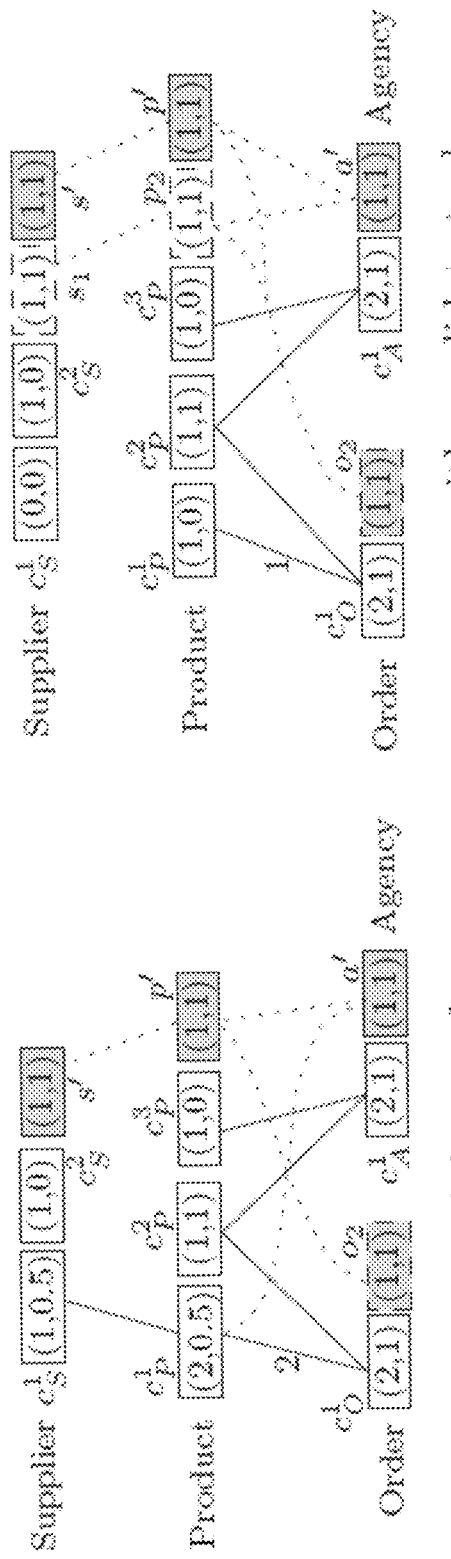

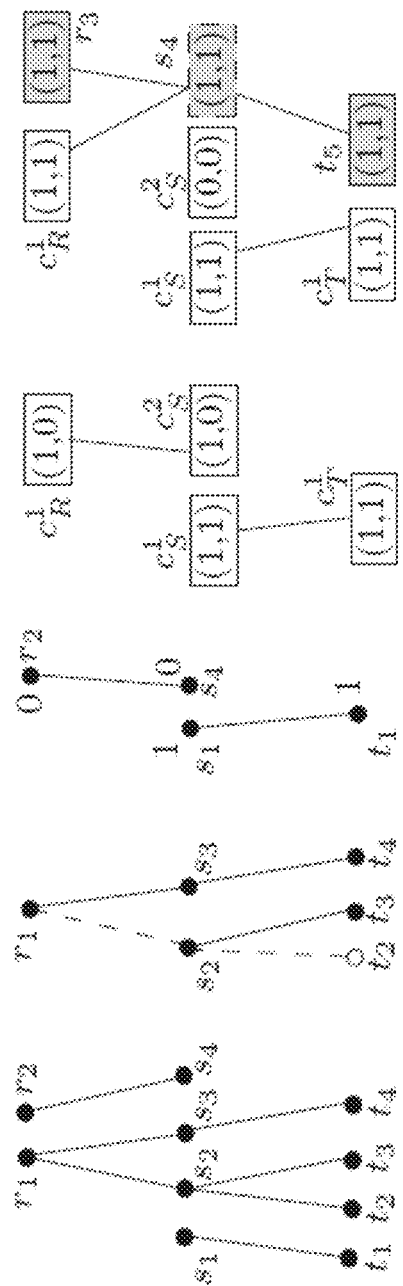

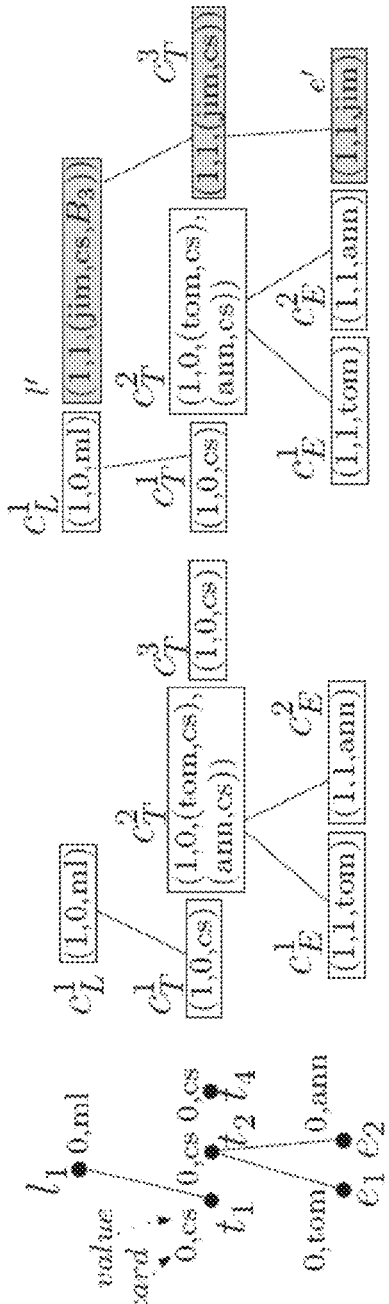

Procedure candidate_tuples
Input: join tree $J_\mathcal{V}$, negative graph $G^-$, the number of candidate sets $k$, the join attributes $\mathcal{A}$ of $J_\mathcal{V}$
Output: a set of candidate tuples 01  $(t_u, t_v)$.capacity = $\infty$, $\wedge(t_u, t_v) \in G^- . E$
02  for each $(t_u, t_v) \notin G^-.E$
03    if $t_u \in R_u, t_v \in R_v$ and $(R_u, R_v) \in J_\mathcal{V}.E$
04      add $(t_u, t_v)$ into $G^-$
05      set $(t_u, t_v)$.capacity = $log(\text{max\_prob}((t_u, t_v)))$
06  add a single sink and a single source to connect the sink(s) and source(s) of $J_\mathcal{V}$, respectively
07  add a sink and a source to connect the sink(s) the source(s) of *each* connected subgraph in $G^-$
08  set the capacity of the edges connecting to the sink or the source to infinity
09  $C = \emptyset$ and $G' = G^-$          // initialization
10  while $|C| < k$ and $G' \neq \emptyset$
11    $g = \text{max\_flow}(G')$
12    $g = \text{extend}(g)$
13    $C = C \cup \{t_i | t_i \in g', g' \in g\}$
14    for each $g' \in g$   $G' = G' - g'$
15  return $C$

Fig. 11

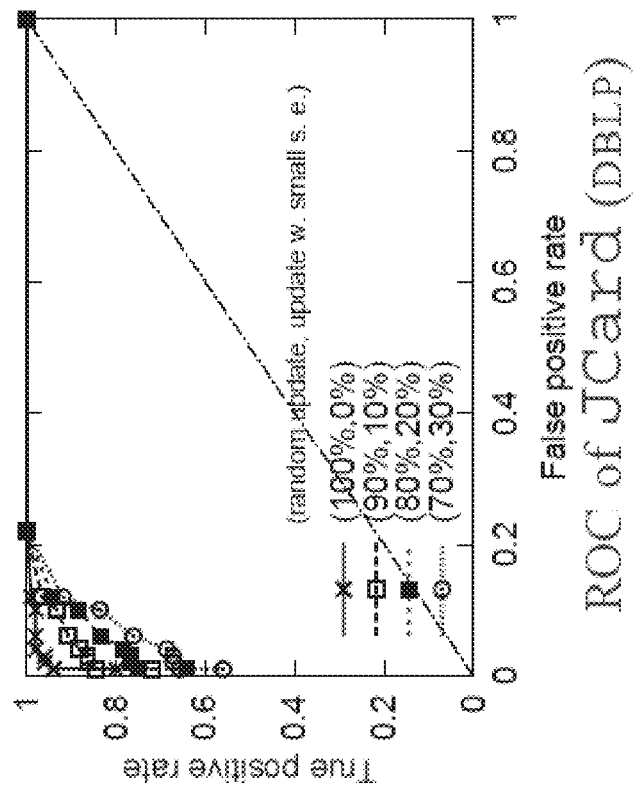
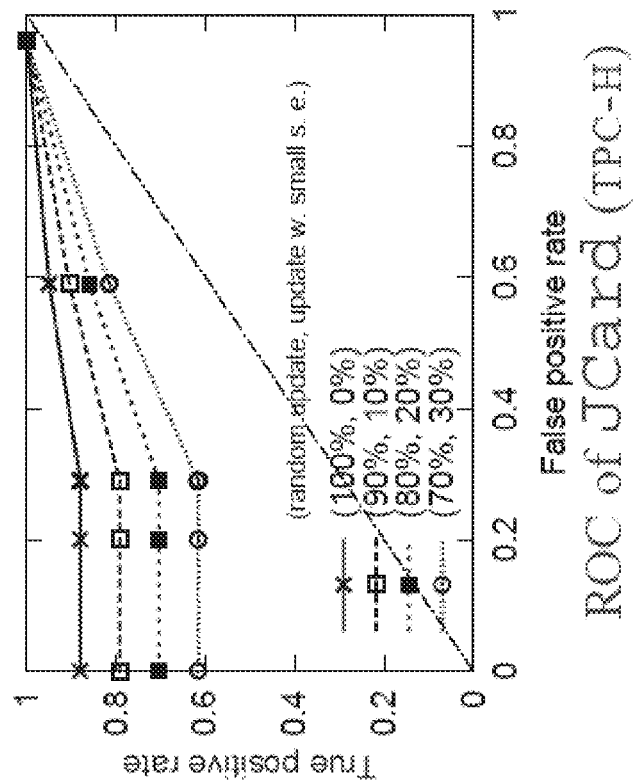
Fig. 12A
Fig. 12B

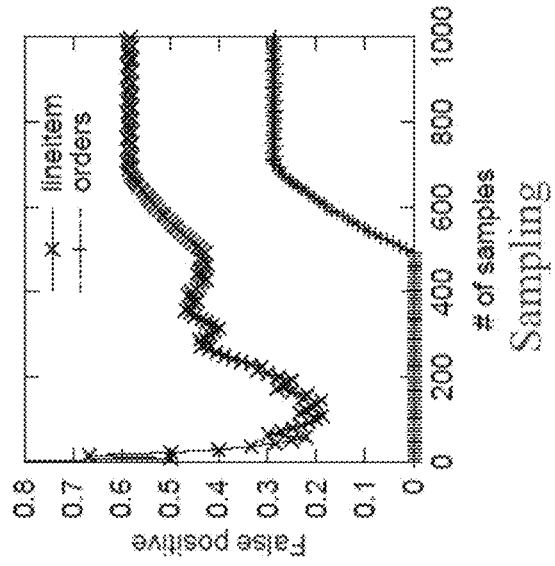
Fig. 16C Sampling
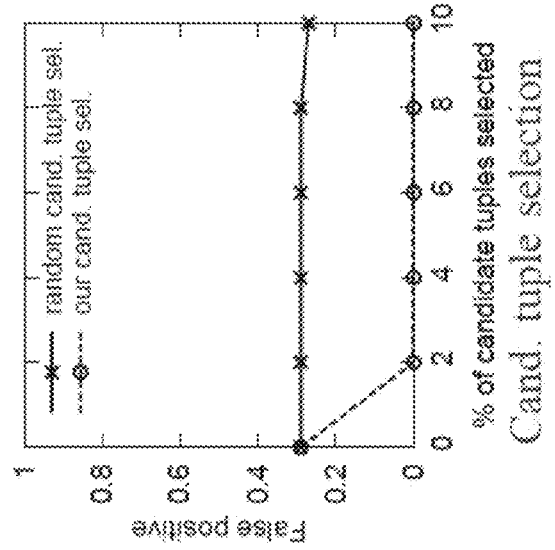
Fig. 16B Cand. tuple selection
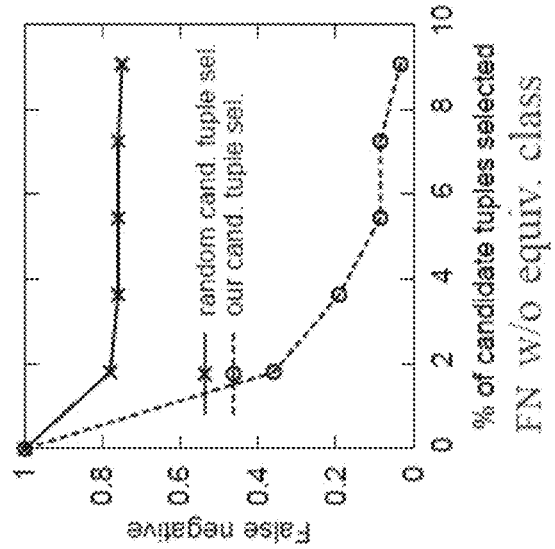
Fig. 16A FN w/o equiv. class

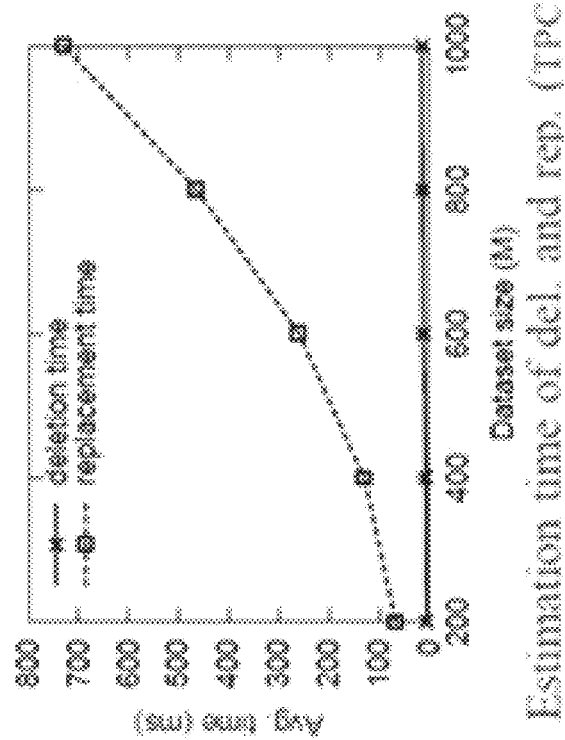
Fig. 17A (a) Estimation time of del. and rep. (TPC-H)
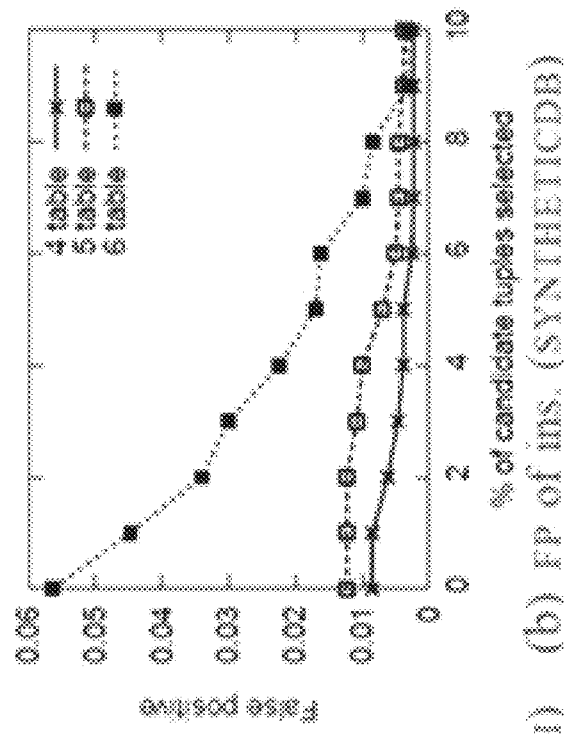
Fig. 17B (b) FP of ins. (SYNTHETICDB)

SYSTEM AND METHOD FOR PERFORMING VIEW UPDATES IN DATABASE SYSTEMS

CROSS REFERENCE TO RELATED APPLICATIONS

The present application claims priority of the U.S. provisional patent application No. 61/863,448 filed Aug. 8, 2013 which the disclosure is hereby incorporated by reference in its entirety.

FIELD OF INVENTION

The present invention relates to method of data-oriented approach to provide a practical support for view updates in database systems. In particular, the present invention provides a summarization of the source database of views that serves as an update filter that aims to efficiently reject untranslatable view updates by estimating the side effects of the updates, thereby avoiding costly translation analysis.

BACKGROUND OF INVENTION

Views have been an important facility provided by database management systems (DBMSs) that allow users to access specific parts of a database. Over the years, views have remained useful in a wide range of emerging applications, such as data publishing or information dissemination, Extensible Markup Language (XML) or Resource Description Framework (RDF) query rewriting, query optimization and tracing facility in peer-to-peer (P2P) networks. It is evident that these applications not only query, but also update views as if they were the actual database. Updates on views are translated to updates on the source databases of the views, and the views and its source databases must keep consistent after updates.

Example 1.1

FIG. 1 shows an example illustrating the view update problem. Referring to FIG. 1, suppose a database system has a view V that joins Product, Supplier, Order, and Agency (for illustration purposes, integrity constraints are omitted in the example), and suppose a user inserts ($S_4$, FL, $P_6$, $C_3$, $A_5$) into V as indicated by $u_1$. The only way to do this would be to insert ($S_4$, FL) into Supplier and ($A_5$, $P_6$) into Agency. However, since tuple $p_2$ is joinable with tuple $s_1$, the insertions of ($S_4$, FL) and ($A_5$, $P_6$) will cause an unspecified effect of inserting ($S_4$, LA, $P_6$, $C_3$, $A_5$) into V. Therefore, the database system cannot translate $u_1$ without causing extraneous tuple(s) in V.

Updates through views have been one of the classical problems in database theories. Nonetheless, data are now ubiquitous and often provide insights to seemingly hard problems, yet view update analysis can often be computationally expensive. For instance, the view update problems under many settings are NP-hard (Non-deterministic Polynomial-time hard). Much extant work on view update analysis relate to directly translating view updates, which can sometimes be inefficient.

SUMMARY OF INVENTION

In accordance with a first aspect of the present invention, there is provided a method of data-oriented approach for performing view updates in database systems comprising the steps of: processing one or more source databases of views to generate at least one summarization of the one or more source databases; utilizing the at least one summarization of the one or more source databases to identify one or more side effects associated with the view updates; and whereupon the view updates have one or more side effects, preventing the view updates from being performed.

In one embodiment of the first aspect, the method further comprises the step of: identifying untranslatable view updates by processing the at least one summarization of the one or more source databases, wherein the untranslatable view updates includes view updates with one or more side effects, or view updates that will lead to one or more side effects from being generated; and preventing the untranslatable view updates from being performed.

In one embodiment of the first aspect, the at least one summarization of the one or more source databases is arranged to serve as one or more update filters for preventing untranslatable view updates from being performed.

In one embodiment of the first aspect, the one or more update filters are arranged to be adjusted to be free of estimation errors.

In one embodiment of the first aspect, the one or more update filters are arranged to be adjusted to produce accurate estimations.

In one embodiment of the first aspect, further comprising processing one or more database schemas and view definitions to determine one or more side effects associated with the view updates.

In one embodiment of the first aspect, the method is arranged to be used in at least one of the following applications: data publishing, information dissemination, XML or RDF query rewriting, query optimization and tracing facility in P2P networks.

In one embodiment of the first aspect, the method is arranged to be implemented as software algorithms on at least one computing hardware platform.

In one embodiment of the first aspect, the method is arranged to be implemented as software algorithms on two or more computing hardware platforms across at least one computing or communication network.

In one embodiment of the first aspect, the method is arranged to be implemented as hardware logics on at least one computing hardware platform.

In one embodiment of the first aspect, the method is arranged to be implemented as hardware logics on two or more computing hardware platforms across at least one computing or communication network.

In accordance with a second aspect of the present invention, there is provided am apparatus for implementing the method according to the first aspect of the present invention, the apparatus comprising software algorithms or hardware logics or a combination of both.

In one embodiment of the second aspect, the apparatus is implemented across at least one computing or communication network.

In accordance with a third aspect of the present invention, there is provided a system for performing view updates in database systems using a data-oriented approach, wherein the system comprises at least one data-oriented view updater with at least one side effect detector arranged to: process one or more source databases of views to generate at least one summarization of the one or more source databases; utilize the at least one summarization of the one or more source databases to identify one or more side effects associated with the view updates; and preventing view updates with one or more side effects from being performed.

In one embodiment of the third aspect, the at least one data-oriented view updater further includes at least one update translator arranged to translate the view updates.

In one embodiment of the third aspect, the at least one data-oriented view updater with the at least one side effect detector is further arranged to further arranged to identify untranslatable view updates by processing the at least one summarization of the one or more source databases, wherein the untranslatable view updates includes view updates with one or more side effects, or view updates that will lead to one or more side effects from being generated; and to prevent the untranslatable view updates from being performed.

In one embodiment of the third aspect, the at least one side-effect detector and the at least one update translator are further arranged to process one or more database schemas and view definitions to determine one or more side effects associated with the view updates.

In one embodiment of the third aspect, the at least one side-effect detector comprises a Join Cardinality summary structure which includes database summaries and a set of candidate tuples.

In one embodiment of the third aspect, the Join Cardinality summary structure is further arranged to support side effect estimations of insertions, deletions, and replacements on the view updates.

Those skilled in the art will appreciate that the invention described herein is susceptible to variations and modifications other than those specifically described.

The invention includes all such variation and modifications. The invention also includes all of the steps and features referred to or indicated in the specification, individually or collectively, and any and all combinations or any two or more of the steps or features.

Other aspects and advantages of the invention will be apparent to those skilled in the art from a review of the ensuing description.

BRIEF DESCRIPTION OF DRAWINGS

The above and other objects and features of the present invention will become apparent from the following description of the invention, when taken in conjunction with the accompanying drawings, in which:

FIG. 1 shows an example of four tables, namely Product, Supplier, Order and Agency, a view V joining time, and two view updates $u_1$ and $u_2$ for illustrating the view update problem.

FIG. 3A is a join tree in one example of the present invention, the join tree being rooted at Supplier, with each node of the join tree being a table.

FIG. 3B is a database graph G of FIG. 3A in one example of the present invention, each node in the database graph is a tuple.

FIG. 3C illustrates an embedding of the database graph of FIG. 3B.

FIG. 3D illustrates a partial embedding of the database graph of FIG. 3B.

FIG. 4A shows a source graph $G^+$ of the database graph G of FIG. 3B.

FIG. 4B shows a negative graph $G^-$ of the database graph G of FIG. 3B.

FIG. 5A shows the tuples in $G^-$ of FIG. 4B and the join cardinality of tuples in one example of the present invention.

FIG. 5B shows the Jcard equivalence classes of FIG. 5A with the tuples grouped by their Jcard equivalence relation in one example of the present invention.

FIG. 5C is the Jcard summary of $G^-$ of FIG. 5A in one example of the present invention, each Jcard equivalence class is represented by a pair.

FIG. 5D is a candidate tuple in $G^-$ of FIG. 5A in one example of the present invention.

FIG. 6 shows a side effects estimation algorithm for estimating side effects in accordance with one embodiment of the present invention.

FIG. 7 shows a propagate algorithm for estimating the number of new view tuples in accordance with one embodiment of the present invention.

FIG. 8A shows the propagation of join cardinality without candidate tuples on the JCard summary of FIG. 5C.

FIG. 8B shows the propagation of join cardinality with candidate tuples on the JCard summary of FIG. 5C.

FIG. 9A shows the base tables joined in view V in one example of the present invention.

FIG. 9B is the database graph G of FIG. 9A in one example of the present invention.

FIG. 9C is the source graph $G^+$ of FIG. 9B in one example of the present invention.

FIG. 9D is the negative graph $G^-$ FIG. 9B in one example of the present invention.

FIG. 9E is the JCard summary of $G^-$ of FIG. 9D in one example of the present invention.

FIG. 9F shows the Jcard propagation on the JCard summary of $G^-$ of FIG. 9D.

FIG. 10A shows the base tables joined in view V in one example of the present invention, illustrating how JCard support views having projection.

FIG. 10B is the negative graph $G^-$ of FIG. 10A in one example of the present invention.

FIG. 10C is the extended JCard of FIG. 10B in one example of the present invention.

FIG. 10D is the propagation on the JCard of FIG. 10C in one example of the present invention.

FIG. 11 shows the candidate tuple selection algorithm in accordance with one embodiment of the present invention.

FIG. 12A shows the ROC curves of the JCard on TPC-H dataset in accordance with one embodiment of the present invention.

FIG. 12B shows the ROC curves of the JCard on DBLP dataset in accordance with one embodiment of the present invention.

FIG. 16A shows the false negatives in relation to the percentage of candidate tuples selected in TPC-H dataset in one embodiment of the present invention.

FIG. 16B shows the false positives in relation to the percentage of candidate tuples selected in TPC-H dataset in one embodiment of the present invention.

FIG. 16C shows the false positives in relation to the number of samples in TPC-H dataset in one embodiment of the present invention.

FIG. 17A shows the estimation time of deletions and replacements for JCard in accordance with one embodiment of the present invention.

FIG. 17B shows the false positives of insertion in relation to the percentage of candidate tuples selected in Synthetic DB dataset in one embodiment of the present invention.

DETAILED DESCRIPTION OF INVENTION

Figure 2:
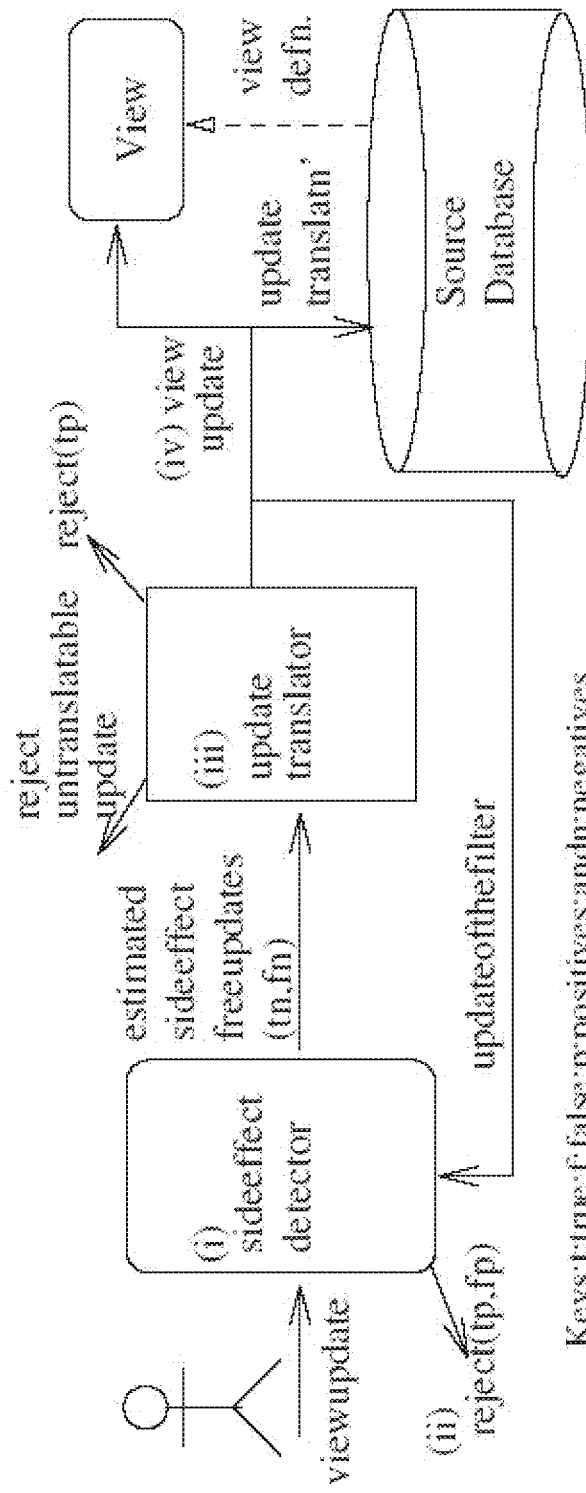
FIG. 2 shows the overview of a view updater in accordance with one embodiment of the present invention.

With reference to FIG. 2 of the present invention, there is provided a method of data-oriented approach for performing view updates in database systems comprising the steps of: processing one or more source databases of views to generate at least one summarization of the one or more source databases; utilizing the at least one summarization of the one or more source databases to identify one or more side effects associated with the view updates; and whereupon the view updates have one or more side effects, preventing the view updates from being performed.

FIG. 2 also provides a system for performing view updates in database systems using a data-oriented approach, wherein the system comprises at least one data-oriented view updater with at least one side effect detector arranged to: process one or more source databases of views to generate at least one summarization of the one or more source databases; utilize the at least one summarization of the one or more source databases to determine one or more side effects associated with the view updates; and prevent view updates with one or more side effects from being performed.

In practice, view updates often cause side effects. The present invention focuses on side-effect analysis. One embodiment of the present invention relates to rejecting (also referred as to filtering) view updates in the early stages during side-effect detection. Preferably, only side-effect free updates (view updates that are free of side effects) are passed to the necessarily heuristic update translation. More importantly, in the present invention when a certain degree errors in the detection are tolerated/allowed, the detection speed can be significantly faster. In the present invention, view updates that are untranslatable or estimated to be untranslatable are rejected early, enabling less costly update translation. In another embodiment of the present invention there is provided a new data-oriented approach that extensively exploits data summaries in source databases, in addition to schema information and view definitions, to extend practical support of view update(s).

The present invention also provides, in one embodiment, a data-oriented view updater having one or more side-effect detectors and one or more update translators. The side-effect detector(s) and update translator(s) in the view updater are arranged to exploit data summaries of source databases, in addition to database schemas and view definitions.

Overview of the Updater.

FIG. 2 depicts an overview of the proposed updater in accordance with one embodiment of the present invention. The proposed updater is operable to function in the following steps: (i) The side effect detector efficiently estimates side effects caused by a view update. (ii) The side effect detector rejects those with side effects. Preferably, the detector can be adjusted to be exact (i.e., no estimation error) such that no tuple in a source database is ever summarized. (iii) Updates of the view (view updates) that are not filtered by the detector are processed by an update translator. (iv) Translatable view updates are applied to the database, the view and the side-effect detector. In the present invention, the updater is preferably independent of translation algorithms. For illustration purposes, the present application assumes the heuristics of SAT, amongst the ample work on translation algorithms. The focus of the present invention is on the operations and functions of a side-effect detector in the view updater.

Example 1.2

The performance improvement from a side-effect detector can be illustrated via a simple experiment with TPC-H benchmark dataset (1G bytes) and a view definition derived from a simplified Q7 of the benchmark. Note that the side-effect detector is tunable to compromise between estimation time and error. In one exemplary experiment, the detection time of Q7 is approximately 3 s whereas the estimation time is smaller than one second. It is easy to tune or adjust the detector to be error free.

Denoting the side-effect estimation time as t and assuming variable T captures the time for update translation, which is at least 100 s (i.e. t<<T). Further assume that 20% of view updates are side effect free view updates, whereas 80% of the updates have side effects. It can be deduced that, without the side-effect detector, the view update time is simply T (i.e., at least 100 s), whereas with a side-effect detector the view update time with no observed error is t+0.2T. Therefore, the view update analysis time is reduced by almost 80%, from T to t+0.2T.

Detecting side effects can be significantly more efficient than translating updates (recall Example 1.2), as a detector only requires to signify the absence and presence of side effects. Thus, to support this, one embodiment of the present invention proposes a Join Cardinality Summary (JCard). The JCard of the present invention relies on the structures of join cardinality equivalence classes and candidate view tuples. The JCard operates in the following manner: First, summarize the tuples of a database by equivalence classes. Preferably, JCard is often very small and side-effect estimation on JCard is efficient. Although the estimated count of side effects using the equivalence classes may be far from the exact one, it is sufficient to detect the presence of side effects. Second, to support accurate estimations, it is proposed to refine the classes by selecting certain candidate view tuples based on how likely they are to appear in views.

Experiments show that using a small number of candidate tuples leads to highly accurate estimations.

Due to the nature of the view update problem, any practical algorithm that runs in PTIME necessarily rejects some translatable updates. Thus, side-effect estimation allows the introduction of a small number of additional errors but further optimizes the detection time. In Example 1.2 previously described, the detection time was around 3 s and the estimation time was smaller than one second, whereas the summarization did not introduce errors. The overall benefit of the side-effect detector in one embodiment of the present invention may also depend on the percentage of view updates with side effects. For instance, following up on Example 1.2, if view updates having side effects account for x % of all updates, the updater in one embodiment of the present invention reduces the time of view update analysis by up to x %. It is observed from popular real-world and synthetic benchmark datasets and random updates that view updates with side effects arise very often. Thus, in practice, the side-effect detector has a high potential of avoiding potentially costly update translations.

Preliminaries and Problem Statement

The symbol $\oplus$ is used in the present disclosure to denote an application of an update, e.g., $V'=u\oplus V$ denotes the view after updating V with u.

Syntax for View Definition:

The embodiments of the present invention are presented with an important class of view definitions, namely select, project and join queries (SPJ queries). Any SPJ query can be converted into the following normal form in linear time:

$$\mathcal{V} = \pi_A(\sigma_P(R_1 \bowtie R_2 \ldots \bowtie R_n)),$$

where A is the set of projection attributes of the view, P is the selection predicates and Ri is the relation for $i \in \{1, \ldots, n\}$. The embodiments of the present invention mostly focus on side-effect detection with join queries, which are often technically challenging. The present application also presents extensions to support projections. In this application, it is assumed that the joins form a tree which may simplify the side-effect detection. Note that each relation in V can serve as the root of a join tree and different join trees lead to different estimation accuracies.

Source of View Tuple.

A view tuple tv can be decomposed into n segments, $t_1, \ldots, t_n$, where $t_i = \pi_{A_i}(t_v)$ and $A_i$ denotes the attributes of $R_i$ in V. Let call $\cup_{i=1, \ldots, n} \{t_i | t_i$ is a segment of $t_v$ and $t_i \in R_i\}$ the source of $t_v$. For example, {s2, p3, o3, a1} is the source of the view tuple v1 in FIG. 1. It is remarked that in general, $t_i$ may not always exist in the source database.

View Update Problem.

The view update problem can be presented as follows: Given a view definition V of a relational database instance I, where the view V is V(I), and an update u on the view V, find a translated update u' on I such that $u \oplus V(I) = V(I \oplus u')$.

An update u having a possible update translation u' is called a translatable update. Otherwise, u is called an untranslatable update. Untranslatable view updates are untranslatable often because they lead to certain side effects. The definition of side effects was defined as follows.

Side Effects.

Given an update u on a view V=V(I) and its translation u' on I, side effects of u' are the changes on the updated view $V(I \oplus u')$ that are not specified by u.

The present invention proposes a side-effect detector, which may be further tuned or adjusted to be an efficient estimator. The side-effect detector in some embodiments of the present invention has two types of errors. (i) False positives denote that the view updates do not lead to side effects but the detector declares side effects and rejects the updates. (ii) False negatives denote that the view updates cause side effects in fact but the detector declares no side effect. False positives are the true error of the proposed view updater, whereas false negatives are a performance issue as they will be detected in the update translation. False positives and false negatives will be defined formally in the next section.

Quality of the Side-Effect Detector

This section presents the notion of errors used in the proposed detector of the present invention. A side-effect detector can be considered as a special form of a probability distribution estimator. The next section presents the relationship between the Kullback-Leibler (KL) divergence of probability distribution estimation and the expected error of the side-effect estimation in the embodiments of the present invention. First, the expected side-effect estimation error is bounded by the KL divergence. Specifically, if the KL divergence of the probability distribution estimation tends to zero, the expected side-effect estimation error tends to zero as well. Second, in the context of updates, it is not feasible to enumerate the infinitely-many future updates. In a following section, there is presented a revised notion of errors on a finite set of updates. In the analysis, the current disclosure does not consider alternate sequences of updates where errors depend on the choice of update sequence not detectors. For simplicity, the present disclosure presents its analysis with insertions, unless otherwise specified, as deletions are obviously bounded by the view.

Analysis with KL Divergence

To explain in detail the analysis of the estimation quality, recall the definition of KL divergence (KL), which is used to measure the distance between the real and estimated distributions. Let PD(X) and PE(X) be the real distribution and the estimated distribution of a random variable X, respectively. Then, this will lead to the following:

$$KL(P_D(\mathbb{X}) \| P_E(\mathbb{X})) = \sum_{X \in \mathbb{X}} P_D(X) \log \frac{P_D(X)}{P_E(X)}$$

The present disclosure uses random variables S and J to capture possible selections and joins on attributes of all possible views V on a database instance I. The present disclosure uses a random variable M to denote possible insertions. (An insertion event M∈M is modeled as (S, J), where S∈S and J∈J.) For simplicity, the present disclosure skipped projections in this analysis, as detectors can be extended with projections. It is remarked that an insertion may involve attributes besides S and J. The analysis of these attributes is trivial and hence omitted. Let |V| denote the size of view V∈V before an insertion and let freal(M, V) and fest(M, V) denote the real and estimated view sizes after an insertion, respectively. In some embodiments, the present invention may omit M and V when they are clear from the context.

As discussed in a previous section, a side-effect detector has two kinds of errors: false positives E+ and false negatives E−. Let θ be a user-tunable parameter of acceptable estimation errors, where 0≤θ≤1. The formal definitions of E+ and E− are given below.

Definition 4.1:
False positives E+(M,V): Given an insertion M on a view V, E+(M,V) is defined as follows:
E+(M,V)=1, if freal=|V|+1 and fest≥freal+θ; and
E+(M,V)=0, otherwise.

Definition 4.2:
False negatives E−(M,V): Given an insertion M on a view V, E−(M,V) is defined as follows:
E−(M,V)=1, if freal>|V|+1 and fest<|V|+1+θ; and
E−(M,V)=0, otherwise.

The E+ and E− are two binary random variables. The expected error can be expressed as the integration of all possible insertions M on all possible views over their probability distribution P(M,V):

$$EXP(E_+(\mathbb{M}, \mathbb{V})) = \sum_{M \in \mathbb{M}} \sum_{V \in \mathbb{V}} P(M, V) \times E_+(M, V).$$

It is highlighted that a side-effect detector is not simply a classical estimator of cardinalities. Classical works on selectivity estimation focus on overall accuracies of estimated cardinalities. However, side-effect estimation requires only an accurate estimation of cardinalities that signifies the boundary between the absence or presence of side effects.

Example 4.1

To illustrate the main difference between side-effect estimation and cardinality estimation, this disclosure presents two detectors, namely Jlineitem and Jorder, on a simplified Q7 of TPC-H. While the details of these detectors are presented in a further section, they can now be understood as detectors using different summaries of the result of Q7 and the source database. Setting θ to 1. That is, a view insertion with side effects changes the view size by a number greater than or equal to 2. This disclosure tried 1800 insertions, all with side effects. It is reported that the error of cardinalities of Jlineitem was 3.7 times smaller than that of Jorder. In contrast, a side-effect detector requires to distinguish (i) the insertions that change the view size by 1 and (ii) those greater than 1. The exact change in cardinalities that is larger than 1 is not important. With this notion of errors, an exemplary experiment of the present invention found that Jlineitem exhibited 79 incorrect side-effect estimations while Jorder did not produce any incorrect estimation.

While false positives and false negatives of a side-effect detector are defined with an error threshold θ, the quality of a detector still exhibits a close relationship with the KL divergence. These are summarized in Propositions 4.1 and 4.2.

Proposition 4.1:
When KL divergence of the estimated distribution of insertions tends to 0, i.e., KL(PD(M,V)∥PE (MV))→0, the expected false positives of the detector tends to 0, i.e., EXP(E+(M,V))→0.

Proposition 4.2:
When KL divergence of the estimated distribution of insertions tends to 0, i.e., KL(PD(M,V)∥PE(M,V)→0, the expected false negatives of the detector tends to 0, i.e., EXP(E−(M,V))→0.

Proof Idea:
The current disclosure models the possible views and their updates by random variables. The expected value of false positives is expressed in terms of these variables. In the arithmetic derivations, it is apply the Markov's inequality and Pinsker's inequality to obtain a bound that consists of KL divergence. Then, it is easily show that as KL divergence tends to zero, so does the expected values.

Revised Notion of Errors

Propositions 4.1 and 4.2 showed that it makes sense to construct a side-effect detector by minimizing the KL divergence between the detector and the actual data. The unique problem in a side-effect detector is that the KL divergences are defined on all possible future insertions, which can be infinitely-many. However, the relative qualities of detectors only depend on certain attributes of the database, and more importantly, a finite set M' of insertions.

Let $t_v$ denote the view tuple to-be-inserted and $t_v.A$ denote the value of A in $t_v$. Let dom(A) and adom(A) denote the domain and active domain of attribute A, respectively. Next, the present disclosure presents the attributes and insertions that are irrelevant to the relative qualities of the detectors.

(i) Suppose attribute A is projected out. If |dom(A)| is infinite, or |dom(A)| is finite but |adom(A)|<|dom(A)|, A is irrelevant to the qualities of detectors as an update translation can always find a new value of A without causing side effects. (ii) On the other hand, if A is in a view definition, regardless of its domain. If $t_v.A$ is new, $t_v.A$ does not cause side effects and is irrelevant to the detector's quality. Otherwise, $t_v.A$ exists in the database and the number of its possible values is bounded by |adom(A)|.

Based on the observations above, in Definition 4.3, it is formalized the effective insertions that affects detectors' qualities. It is remarked that Definition 4.3 is independent of any error metrics. Moreover, this notion of errors is useful in building summaries for side-effect estimation/detection.

Definition 4.3:
Effective insertions of a view V(I) are a finite set M, where M' is an enumeration of insertions on:
 the active domains of the attributes on V; and
 the domains of the attributes of finite domains in the relations participating in V.
The revised error of a detector is its error on M'.

Join Cardinality Summary (JCard)

In a preferred embodiment of the present invention, there is proposed a join cardinality summary (JCard) for estimating side effects. JCard is specially designed for joins since joins are technically challenging in SPJ views. For illustration purposes, this disclosure presents JCard with insertions, unless otherwise specified. In one embodiment, JCard has two components. (i) The first one (called the negative graph) is the summary of the dangling tuples of a database (i.e., those do not currently form any view tuple); and (ii) the second one (called the source graph) is candidate tuples and they capture how close dangling tuples may form view tuples, under random insertions. When a view tuple is inserted, both components are used to estimate the change of the view size. For simplicity, in this section, it is assumed that the primary keys of the tuples are present in the views (i.e., SJ views).

TERMINOLOGIES AND NOTATIONS

First, suppose the view V involves R1, . . . , Rn relations. Then a join tree JV is constructed as follows. Each relation Ri forms a node in JV, also denoted by Ri as the meaning is often clear from the context. If there is a join between Ri and Rj in V, then an edge (Ri, Rj) is added to JV. The join tree rooted at Ri is denoted as JRi. Join trees of different roots may have different accuracies in side-effect estimation.

In this disclosure, a database graph G(V,E) is used to represent the database I. A node t∈V denotes a tuple t in I and an edge (t, t')∈E denotes that t and t' are joinable with V.

Example 5.1

Consider the view shown in FIG. 1. FIG. 3A presents the join tree JSupplier rooted at Supplier in accordance with one example of the present invention. FIG. 3B shows the database graph G.

The next section introduces the terminologies to discuss the tuples summarized in JCard.

Embeddings and Partial Embeddings.

Suppose S is a set of tuples in G where each tuple belongs to a distinct relation in JV. If the tuples in S form a view tuple, S is called an embedding of the join tree JV. Otherwise, S may form a partial embedding of JV, defined in Definition 5.1.

Definition 5.1:

Given a set of tuples S in a database graph G and a join tree JV, S is a partial embedding of JV, if
(i) the tuples in S together with the tuples in G do not form a view tuple;
(ii) each tuple in S belongs to a distinct relation;
(iii) the tuples in S are joinable; and
(iv) S is maximal, i.e., no tuple can be added to S and (i)-(iii) are true.

Example 5.2

Continue with Example 5.1. FIG. 3C shows an embedding of JSupplier in one example of the invention as the tuples are of different relations and they form the view tuple v3 in FIG. 1. {s1, p2, o2} shown in FIG. 3D is a partial embedding. However, S={p4, o4, a2} is not a partial embedding as S and s4 form a view tuple. S'={p2, o2} is not a partial embedding as s1 can be added to S' and Conditions (i)-(iii) of Definition 5.1 are true. {s5, p6, a3} is also not a partial embedding as the tuples are not joinable.

Dangling Tuples and Extended Dangling Tuples.

Dangling tuples are the tuples that do not form an embedding. Dangling tuples may become non-dangling (i.e., form view tuples) after an insertion. The estimation of side effects is more accurate with not only dangling tuples but also extended dangling tuples (Definition 5.2). The intuition is that given an insertion, some dangling tuples may become non-dangling and the extended dangling tuples may cause additional view tuples, i.e., side effects. Finally, it is remarked that extended dangling tuples may join with some other tuples and unlike dangling tuples, they may appear on the view.

Definition 5.2:

Extended dangling tuples comprise (i) dangling tuples; and (ii) the tuples that can form, together with some dangling tuples, a partial embedding of any sub-tree of the join tree JV.

Example 5.3

In FIG. 3B, p2 is an extended dangling tuple as it is a dangling tuple (Definition 5.2(i)). o4 is an extended dangling tuple as it forms a partial embedding {o4, a2, p5} with the dangling tuples a2 and p5 (Definition 5.2(ii)).

Similar to tuples in a database, the dangling and extended dangling tuples may be represented by graphs.

Definition 5.3:

Given a source database I of a view V, the database graph obtained from the extended dangling tuples in I is called the negative graph $G^-$. The database graph obtained from the source tuples of the view V is called the source graph $G^+$.

Example 5.4

FIG. 4A shows the source graph $G^+$ of the database graph in FIG. 3B in one example of the present invention. FIG. 4B shows the negative graph $G^-$ of the database graph in FIG. 3B in one example of the present invention.

It is remarked that $G^+$ contains all the embeddings in G, and $G^-$ contains all the partial embeddings in G. $G^+$ and $G^-$ may be overlapping due to the extended dangling tuples but $G^+ \cup G^- = G$ holds. $G^+$ and $G^-$ together are an exact representation of the database I, in the sense that any side effect of updates on I can be determined from them. Obviously, the sizes of $G^+$ and $G^-$ is O(|I|), which can be too large for efficient estimations. Therefore, this disclosure summarizes them in the next subsection.

JCard Definition

JCard consists of $G^+$ and $G^-$. It handles $G^+$ and $G^-$ differently. $G^+$ contains the embeddings, which are the tuples of the view, and can be easily maintained and indexed. In this subsection, the focus is on the summary of $G^-$.

The summarization of $G^-$ is derived from a notion of join cardinality equivalence between nodes, denoted as t1≈t2, w. r. t. a join tree JV. The definition of join cardinality equivalence relies on the join cardinality of tuples.

Definition 5.4:

Given a join tree $J_{Ri}$ (rooted at Ri of V) and a negative graph $G^-$, let t be a tuple in R∈V, the join cardinality of t, denoted as t.jcard, is defined as follows.
(i) If R is a leaf relation in $J_{Ri}$, t.jcard=1;
(ii) Otherwise, t.jcard=$\prod_{R' \in \mathfrak{R}} (\Sigma_{(t,t') \in G^-, t' \in R'}$(t'.jcard)),
where $\mathfrak{R}$ be the set of child relations of R in $J_{Rj}$.

The intuition of t.jcard is that traverse the join tree JRi bottom-up and join the relations visited, and t.jcard is the number of intermediate join results containing t when the bottom-up traversal reaches R.

Example 5.5

Consider the negative graph G− in FIG. 4B and the join tree JSupplier in FIG. 3A. FIG. 5A shows the join cardinalities of tuples in G− in one example of the present invention. The jcards of the tuples in Order and Agency are 1 by Definition 5.4(i). Tuples in Product and Supplier are the product of the jcards of their child relations, respectively, by Definition 5.4(ii). In particular, p1.jcard=1×0=0, where o1.jcard is 1 as p1 joins with o1 in Order; and 0 is jcard from Agency as p1 does not join with any tuple in Agency.

Definition 5.5:

Given a join tree JRi (rooted at Ri of V) and a negative graph G−, t1 and t2 are cardinality equivalent (denoted as t1≈t2) if the following statements hold:
(i) t1 and t2 are in the same relation R;
(ii) t1.j card=t2.j card; and
(iii) the child relations of R, in which t1 has joinable tuples, are identical to those of t2.

Side-effect estimation using G− is accurate due to the following reason: JCard (G−) summarizes the tuples by the equivalence classes. All partial embeddings in G− are compactly represented by equivalence classes. Upon an insertion of a tuple, the tuple is joined with the equivalence classes and the estimation is to determine the average joinable tuples in a class. When the insertion produces a large or moderate number of new embeddings (side effects), the average count is sufficient to signify the presence of side effects.

Example 5.6

FIG. 5B shows the join cardinality equivalence classes corresponding to the join cardinalities of tuples shown in FIG. 5A. It is remarked that even though p1 and p6 have the same jcard 0, they are of different classes as Order is the joinable child relation of p1, but that of p6 is Agency (Definition 5.5(iii)).

JCard Structure and its Construction.

In a preferred embodiment, JCard is a graph of supernodes, where each supernode represents an equivalent class in G−. The supernode of the equivalent class c is also denoted by c as the meaning is clear from the context. A supernode is a binary tuple (|c|, c.est), where |c| is the number of tuples in c and c.est is the estimated average jcard of the tuples in c. JCard is constructed by the rules below.
1) For each leaf relation R in JRi, create a supernode (an equivalence class) for all tuples in R, as all tuples in R are cardinality equivalent, by Definition 5.5.
2) Construct JCard bottom-up:
a) For each non-leaf node R in JRi, partition the tuples in R by Definition 5.5;
b) For each equivalence class, create a supernode c to represent that class and add an edge (c, c') if there exists tuples in c that join with tuples in c'; and
c) Determine the weight |Ec,c'| of (c, c') as the number of joins between the tuples in c and those in c', where |Ec,c'| will be used in estimation.

Example 5.7

FIG. 5C presents the JCard summary of G− in FIG. 4B. Each node in FIG. 5C summarizes an equivalent class in FIG. 5B. In particular, the node c3P (1, 0) means that the class c3P contains one tuple and the average join cardinality of tuple in c3P is 0. |Ec1A,c3P|=1 means that there is one join between c1A and c3P.

There are two remarks on JCard worth-noting. First, for simplicity, Definition 5.5 defines the equivalence based on identical count. In general, it may define an equivalence using similar counts, which leads to even smaller summary graphs. Experiments with TPC-H and DBLP show that by using Definition 5.5, lead to small summaries of the benchmark datasets, without further reduction the summary size. Second, since summary graphs were always analyzed, the notations G− and G+ were overloaded to refer to the summaries, unless otherwise specified.

Candidate View Tuples.

JCard summarizes tuples in G− based on (join) cardinalities. Certainly, the cardinalities are directly relevant to the number of view tuples generated from insertions. However, it does not consider how likely dangling tuples may form view tuples. Suppose that view insertions are random, the dangling tuples that form an embedding with just fewer new tuple segments will form view tuples easier than other dangling tuples. Therefore, JCard's second structure is sets of candidate view tuples. Each set of candidate view tuples is simply a set of tuples that forms a partial embedding to the join tree. The rank of each tuple set is defined to be the number of new tuple segments needed to form an embedding. Each individual candidate tuple will be split from its original equivalence class and form an individual equivalence class in G− by itself (i.e. no summarization).

Example 5.8

Continuing with Example 5.7, if a budget to take one candidate tuple set, {s1, p2, o2} or {o4, p5, a2} will be selected as they will form embeddings by one additional segment, respectively. Specifically, {s1, p2, o2} needs a new segment of Agency joinable to p2 and {o4, p5, a2} needs one of Supplier joinable to p5, whereas other two partial embeddings need two segments.

Side-Effect Estimation with Jcard

As illustrated in Example 4.1, traditional join cardinality estimations may not be suitable for side-effect estimation as they minimize overall errors on cardinalities. This section presents a side-effect estimation algorithm on JCard in a preferred embodiment of the present invention.

The side-effect estimation of a view insertion tv in one embodiment of the present invention consists of two steps. The first step is to join tv with the source tuples of V in G+. If the join result is not empty, then tv forms additional view tuple(s) (i.e., side effects) and hence is rejected. Otherwise, the second step estimates the join cardinality of tv with the extended dangling tuples in G−. This section focuses on the second step.

FIG. 6 presents the overall estimation algorithm in one embodiment of the present invention. The inputs of estimate_side_effects are the JCard, the view definition in the form of join tree JR, the view tuple to-be-inserted tv and a parameter θ on the error threshold. estimate_side_effects estimates the number of new view tuples generated by inserting tv. Recall that estimate_side_effects declares a side-effect free insertion when the estimated number of new view tuples is smaller than 1+θ; otherwise, it declares side effects.

The details of estimate_side_effects can be described as follows. Given that a view tuple tv is to-be-inserted, tuple tv is decomposed into n segments t1, . . . , tn, where n is the number of relations in JR, by decompose_view_tuple in Line 01. Each segment ti corresponds to a relation Ri in JR. t1, . . . , tn form at least an embedding on JR for a valid insertion. Update JCard via update_equiv_class for a more accurate estimation. In a nutshell, update_equiv_class creates a new equivalence class in G− for each new segment. If ti exists in G−, ti is split from its original equivalence class and the edge weights of JCard is updated correspondingly.

The essence of Procedure propagate is the propagation logic of estimation of counts (see Line 04 of FIG. 6). Lines 05-06 in FIG. 6 simply sum up all the estimation counts of the classes that may form embedding(s) with tv.

Propagation of estimation counts. Procedure propagate is a recursive procedure that estimates the number of new view tuples by inserting the view tuple tv (see FIG. 7). The recursion is simply to: propagate traverses $G^-$ top-down from the equivalence classes of the root relation of JR (Line 06 of FIG. 7). The estimated count of a leaf equivalence class is 1 (Line 02 of FIG. 7) and that of an internal class is computed by the formulas in Lines 07 and 08 of FIG. 7. Specifically, given a class c, Line 07 of FIG. 7 sums up the counts propagated from the equivalence classes of a child relation of c. This formula assumes that the values of the join attributes have the same probability in participating the join. Therefore, one tuple in c obtains $|Ec,c'|/|c|$ of c'.est on average, where weight $|Ec,c'|$ of the edge (c, c') in $G^-$ denotes the number of joinable pairs of tuples between c and c'. Line 08 multiplies the counts from all child relations.

A restriction of the definition of JCard described in this document is that it assumes join trees, as propagation always terminates. In practice, acyclic joins are common, e.g., all TCP-H queries, except one, are acyclic. For the joins of a view form a cycle, the spanning tree(s) of those joins (e.g., skipping one join in the cycle) can be readily determined and the method of the embodiments present invention can be readily implemented to filter view updates.

Example 6.1

Consider the view V and the view update u2 of inserting (S5, FL, P6, C3, A4) as shown in FIG. 1. FIGS. 8A and 8B are presented to illustrate the propagation logic on the JCard of V (FIG. 5C) in one example of the present invention. FIG. 8A is the propagation without candidate tuples. The gray boxes are the classes for the segments of the insertion u2, the dashed boxes are the classes split from existing classes and the dotted lines denote the join related to the insertion. (The edge weights that equal to 1 are omitted for presentation brevity.)

Firstly, u2 is decomposed into four segments: s'=(S5, FL) for Supplier, p'=($S_5$, $P_6$) for Product, a'=($A_4$, $P_6$) for Agency and o2=($C_3$, $P_6$) for Order, where s', p' and a' are new segments and o2 is an existing tuple.

In propagation without candidate tuples (FIG. 8A), construct an equivalent class for each segment. The classes are also denoted as s', p', o2 and a', respectively, if it is clear from the context. Since class o2 is split from c10, the size of c10 is reduced by 1. Since a' is joinable with p2 in c1P, an edge (a', c1P) is added into JCard and $|Ea',c1P|=1$. Initially, o2.est and a'.est are 1 as they are of leaf relations. Next, estimate the join cardinality of internal nodes (Line 11 of FIG. 7). For example, c1P.est=c10.est×|Ec10,c1P| |c1P|× a'.est×|Ea',c1P| |c1P|=1×2 2×1×1 2=0.5. Since the number of embeddings in $G^-$ without insertion is 0, obtain the estimated number of new embeddings from the root relation as c1S.est×|c1S|+s'.est×|s'|=0.5+1=1.5. This number is smaller than the real number 2, because of the averaging at c1P.

FIG. 8B is propagation with candidate tuples in one example of the present invention. The propagation with candidate tuples is more accurate (FIG. 8B). Suppose there is one set of candidate tuples {s1, p2, o2} in FIG. 5D. The propagation first splits s1 and p2 from c1S and c1P, respectively, and constructs an equivalent class for each of them (shown in dashed blocks). Note that o2 is kept in the gray block as it is an insertion segment. After the split, $|c1S|=0$, $|c1P|=1$, $|Ec10,c1P|=1$ and $|Ec1P,c1S|=0$. The estimated number of new embeddings are s1.est×|s1|+s' .est×|s'|=1+1=2 after the propagation and the side effect is detected.

Deletions and Replacements

To complete the discussion on updates, the support of deletions and replacements with JCard is presented as follows.

Deletions

In this subsection, the current disclosure extends JCard to support deletions. The side-effect detection on SJ views using JCard is exact and runs in PTIME.

Recall that $G^+$ captures all the source tuples of a view. Embodiments of the present invention can use $G^+$ to determine the side effect of deletions as below.

1) The detection uses the values of primary keys in tv to locate its segments from the relations in G+;
2) For each segment, if it occurs in V multiple times, this segment is not deletable;
3) If all segments are not deletable, $t_v$ is not translatable; Otherwise, embodiments of the present invention can delete any deletable segment as a translation of $t_v$.

If the deletion is side-effect free and translatable, the embodiments of the present invention will delete it from $G^+$ and update both $G^+$ and $G^-$.

Replacements

The main idea of this technique to support replacements is to transform a replacement to a deletion followed by an insertion. Subsequently, the techniques of deletions and insertions can be adopted to support replacements. This method is developed based on the following observation, which holds as the primary keys of relations are present in the SJ views.

Proposition 7.1: Given a replacement replacing $t_v$ to $t'_v$ on a SJ view, the replacement is side-effect free, if and only if the deletion of $t_v$ is side-effect free and the subsequent insertion of $t'_v$ is also side-effect free.

Since the side-effect detection of deletions is exact, the estimation error of replacement equals to that of the insertion; and the replacement time is dominated by the insertion time.

Example 7.1

FIG. 9 illustrates the main steps of replacement in one example of the present invention. The view is a join of relations R, S and T (FIG. 9A), where the primary keys are underlined. FIGS. 9B to 9E illustrate respectively the database graph G, source graph $G^+$, negative graph $G^-$, JCard before insertion. FIG. 9F shows the propagation on the JCard. Suppose the replacement is a view tuple v1 that joins r1, s2 and t2 (shown in dashed lines in FIG. 9C) replaced by another view tuple v2 that joins r3, s4 and t5, where r3 and t5 are new.

Preferably, the replacement is done in two steps: (1) Delete v1 from G. In its segments (i.e., r1, s2 and t2), only t2 is deletable (shown by the circle in FIG. 9C) as it just occurs once in V. Hence, the deletion has no side effect. (2) Insert v2 into V. Following the technique proposed in a previous section, the replacement (i) finds it does not join with any existing tuple in $G^+$ and then (ii) inserts it into $G^-$. FIG. 9F shows that the estimated number of new embeddings after insertion is c1 R.est+r3.est=2 and the side effect is detected.

Projection

It has been known that if the view definitions involve projections, their view update problems often become NP-complete. The main reason is that the attributes projected out (a.k.a., the missing attributes) can be primary keys, foreign keys, or join attributes. This section presents an extension of JCard to support views with projections. (This disclosure discusses insertions with missing join attributes as they are more technically involved.) First, the missing attributes must be filled in by values. Among many feasible fillings, a greedy method can be used to fill in values that may cause the fewest side effects. Second, the cardinality equivalence is extended with attribute values and the estimation algorithm is adjusted accordingly to estimate side effects.

Filling in Missing Attributes

Due to projection, the tuple segments of a view insertion contain missing (join) attributes, which must be filled in, prior to estimation of side effects. Calling the tuple segments with the missing attributes filled in a filling. There is a spectrum of approaches for determining a filling without side effects. For instance, one may directly employ a potentially costly heuristic algorithm to determine a side-effect free filling. Another extreme is to fill in these attributes randomly and estimate the side effects of the filling. This is repeated until a filling with zero side-effect estimate is obtained or the insertion is simply rejected. In this subsection, lets propose a greedy approach for determining a filling.

Definition 8.1:

A filling is feasible if the following holds:
1) the filling does not violate integrity constraints and referential constraints of the source database; and
2) the filling satisfies the selection and joins of the view.

Let s be a tuple segment of a relation R, which is a relation in the view definition V. The joins are on primary keys and foreign keys. Feasible fillings can be greedily determined by the following rules:

Case 1. The projected attribute A is part of the primary key of R.
1) Suppose there is some value p in dom(A) that is not present in R yet, fill in s with the value p. Note that p is new and does not have any existing joining tuples in other relations.
2) If no new primary key is available, then check the tuples $t_s$ in R that are consistent with s. The tuple in $t_s$ with fewer joining neighbouring tuples (edges in database graph G) is selected earlier.

Case 2. The projected attribute A is part of the foreign key referencing to a relation R. The missing value of A is filled in such that it has the fewest number of joining tuples.

Feasible fillings are generated one by one according to the above rules and are passed to the side-effect estimation. Furthermore, users may specify a bound k on the number of feasible fillings passed to the side-effect estimation, with a trade-off on estimation accuracy.

Extension of JCard and its Algorithm

Projections are defined with set semantics, where duplicate values are "removed". Due to the cardinality equivalence of JCard proposed in a previous section, tuples with different values may be placed in the same equivalence class. Subsequently, the estimation algorithm may overestimate side effects. Therefore, the embodiments of the present invention propose a refinement on the notion of cardinality equivalence. In addition to the conditions in Definition 5.5, it is introduced a condition that t1 and t2 are value-cardinality equivalence if they are cardinality equivalent and they have the same values on the projection attributes. The embodiments of the present invention then constructs extended JCard by using value-cardinality equivalence.

The estimation algorithm estimate_side_effects (FIG. 6) is adjusted to incorporate with the value-cardinality equivalence. Specifically, if the count of new embeddings is larger than 1+θ, then the estimator declares side effects. Otherwise, the estimator declares no side effect. However, the logic of the count propagation remains the same.

Example 8.1

Consider a view on a database of three relations, Library L, Teaching T and Enrollment E (see FIG. 10A). The primary keys of the relations are underlined. Suppose that L.course refers to T.course and E.course also refers to T.course. The tuple to-be-inserted is (jim, ie, B3). It can be decomposed into segments l'=(X, B3), t'=(Y, ie) and e'=(jim, Z), where X, Y and Z are the missing attributes to-be-filled in. Suppose the domain of T.course is simply {db, os, ai, ml}. A feasible filling f is: X=Y=Z=db. By using f, t'=t4 and the number of joining tuples between T and E is 1, as t4 joins with e'. The number of joining tuples between T and L is 1, as t4 joins with l'. There are 2 joining tuples in total. If X=Y=Z=ai, the number of joining tuples is 4; 3 for ml; and 4 for os. Hence, the greedy algorithm analyzes f first.

FIG. 10B shows the G⁻ and the join cardinalities extended with values. FIG. 10C shows the extended JCard before insertion and the propagation on the JCard is illustrated in FIG. 10D. Propagate estimates that the view size after inserting the filled tuples and returns 1 new embedding. Hence, the insertion has no side effect.

Optimization Problems in Jcard

There are two important optimization problems in the construction of JCard in one embodiment of the present invention. In the next section, it is shown that selecting the candidate tuples of JCard for accurate side-effect estimation is equivalent to Minimum Set Cover (MSC) and illustrated how approximation algorithms for MSC can be adopted to solve the selection problem. In a further section, the selection of the representation of join trees is made, which is a crucial input to side-effect estimation.

Candidate Tuples Selection

To begin with, the problem of selection of candidate tuples is formalized and its hardness is investigated.

Definition 9.1:

(Selection of Candidate Tuples (SCT)) Given a space budget B, a SPJ view V and the G− summary of the source database, select a set of candidate to minimize side-effect estimation errors of propagate.

Theorem 9.1:

SCT is NP-complete.

Next, it is present a reduction from an SCT instance to an MSC instance. For each possible insertion u, it is created an element u in the universe U. For the tuple si for selection, it is created a clause Ci. For each si whose selection leads to the insertions U accurate, it is ensured that u∈Ci, where u∈U. With such a reduction, it is straightforward that the optimal solution of the MSC instance from this reduction is the optimal solution for the SCT problem as well. Most importantly, the approximation ratio of heuristics for MSC is trivially preserved in such a simple reduction.

The MSC problem has known to be an NP-complete problem that greedy algorithms work well with reasonable bounds. Hence, it is proposed a greedy algorithm, namely Procedure candidate_tuples (shown in FIG. 11), which is equivalent to a greedy algorithm of MSC, whose approximation ratio is known to be OPT×lg(U).

Herein, two observations on candidate_tuples are made. Firstly, it does not require completely reducing an SCT instance to an MSC instance in candidate_tuples. Secondly, there are admittedly many heuristics for the MSC problem. It is proposed Procedure candidate_tuples in the style of a well-known greedy algorithm for ease of analysis.

The main idea of candidate_tuples is to convert the negative graph $G^-$ into a graph with a single source and single sink (Lines 01-08 of FIG. 11). For the joinable tuples (edges) that are not in G-, the embodiments of the present invention introduce them into $G^-$. The capacity of such an edge, denoted as $(t_u, t_v)$, is the logarithm of the probability of tuples with the join attribute values, where it is assumed the values in the domain exhibit uniform probability. A subtle point is that the tuple segments in $G^-$, by definition, do not form an embedding (a view tuple). It is applied a maximum flow from the source to the sink (Line 11 of FIG. 11). The flow is the sum of logarithm of probabilities, which is simply proportional to the product of probabilities. This is equivalent to picking the tuple segments that are most probable to form a view tuple. Minor details include (i) extending the path of maximum flow into a partial embedding, which is one set of candidate tuples (Line 12 of FIG. 11) and iteratively selecting the embeddings from the negative graph until k embeddings are selected (Lines 10-14 of FIG. 11), where k is a user-defined parameter.

The complexity of candidate_tuples is simply the complexity of maximum flow multiplied by k.

Optimal Join Tree Selection

The join cardinality summary JCard $G^-$ previously defined assumes a particular join tree JV of a given view definition V, denoted as $G^-(JV)$. However, given V, there are |V| join tree alternatives, whose accuracies may differ from each other. In this section, it is presented a selection algorithm, that is an adoption of simple sampling technique, to determine the optimal join tree Jopt V with respect to its error produced by the estimation algorithm propagate.

A naive method to select an optimal join tree (i.e., with the smallest error) is to enumerate all possible insertions of join trees. Given a JCard of a join tree $G-(JV)$, one may determine the set M of possible insertions by Definition 4.3. Given a particular insertion m∈M, its error can be determined by calling propagate with $G-(JV)$ and m and comparing the result with a side-effect detection. However, determining the true error of $G(JV)$ requires calling propagate with all permutations of M.

It is proposed to simplify the computation on errors of join trees for practical solutions. Making two assumptions on the problem, firstly assume that insertions are equally probable. Secondly, each insertion is independent. With these assumptions, estimate the proportion of falsely estimated insertions by using sampling. The sample size can be determined by estimation of proportion. In a nutshell, without information about future insertions, the present invention exploits the maximum variance of samples to estimate the true error. The classical result is that the error bound can be determined by 4p0.25/|S|, where S is a sample. For example, the error bound is 5% when the sample size is 400. Furthermore, if the relative accuracies between join trees cannot be distinguished due to errors of sampling, more insertions can always be sampled.

Finally, the details with deletions are similar and deletions are always bounded by the view size.

Experimental Evaluation

This section presents a comprehensive experimental evaluation that verifies the efficiency and effectiveness of the method and system in the embodiments of the present invention.

Experimental settings. Experimented on a PC with a Quad-core 2.4 GHz CPU running Ubuntu 11.04. Implementation was written in C++, using MySQL 5.1. The maximum memory for C++ program was set to only 500 M bytes. In this experiment, the memory representation of the largest test dataset could not fit into 500 M byte memory. Moreover, algorithms are independent of graph storage, which is a research topic in and of itself.

Benchmark datasets. Two publicly available datasets TPC-H and DBLP, and one synthetic dataset SYNTHETICDB (that is devised and implemented by the inventors) are used. There is no dangling tuple in TPC-H and DBLP. Hence, randomly sample subsets of tuples from their relations, respectively, are used to obtain the benchmark datasets. Regarding TPC-H, five test datasets from TPC-H of scaling factor 4.0 are obtained by sampling. They are of the sizes 200 M, 400 M, 600 M, 800 M and 1G, respectively. The 1G dataset is used by default, unless otherwise specified. Regarding DBLP, it is sampled half tuples from the full DBLP as the test dataset. Regarding SYNTHETICDB, the generator is tunable with four parameters: relation number, relation size, primary and foreign key join direction (e.g., R1.FK referred to R0.PK denoted a join from R0 to R1) and the maximum tuple fan-out (e.g., fan-out of a tuple in R0 is the number of tuples in R1 joinable with it). Some characteristics of the three datasets are reported in Table 2.

Error metrics. Let M be the set of insertions tested. Denote S+ and S- be the real-positive and real-negative insertions in M, respectively. In this experiment, set |S+|=|S-|. Let A+ be the estimated positive insertions in S- and A- the estimated negative insertions in S+. The false negative (FN) is |A-| |S+| and the false positive (FP) is |A+| |S-|.

Query workload. Regarding TPC-H, the view is a simplified Q7 in TPC-H. For illustration purposes, lets focus on the joins in Q7.

Regarding DBLP, generated a set of views randomly. The last query shows the view template.

Regarding SYNTHETICDB, the query joining all tables is used as the view. The insertions were generated by the generator with the same parameters.

In this experiment, the performance of the embodiments of the present invention's techniques on FP, FN and the estimation time is analyzed. The reported performances are averaged performances on 1,000 view updates. The performances of various join trees (though they may be overlapping) are plotted to show the present invention's technique is robust against join trees selection.

Experiment A: ROC Curve of JCard

FIG. 12A shows the ROC curves of JCard on TPCH dataset in one example of the present invention whereas FIG. 12B shows the ROC curves of JCard on DBLP dataset in one example of the present invention. To illustrate the performances of JCard in various scenarios, artificial updates are generated. They have tiny side effects, which are hard to estimate, mixed with random updates. The JCard has no candidate tuple. FIG. 12A shows the ROC curves and verifies that the side-effect estimation in embodiments of the present invention performs very well. For instance, the AUC of JCard is 0.74 on workloads with 30% hard updates. From the figure, as expected, the fewer the hard updates, the larger the AUC. It is observed similar results from DBLP (see FIG. 12B). It is remarked that the hard updates are carefully generated by examining the joining tuples from the datasets, which are rare if all updates are considered equally probable. Hence, focus on random updates in the remaining experiments.

Experiment B: Comparison with EDS

Figure 13B:
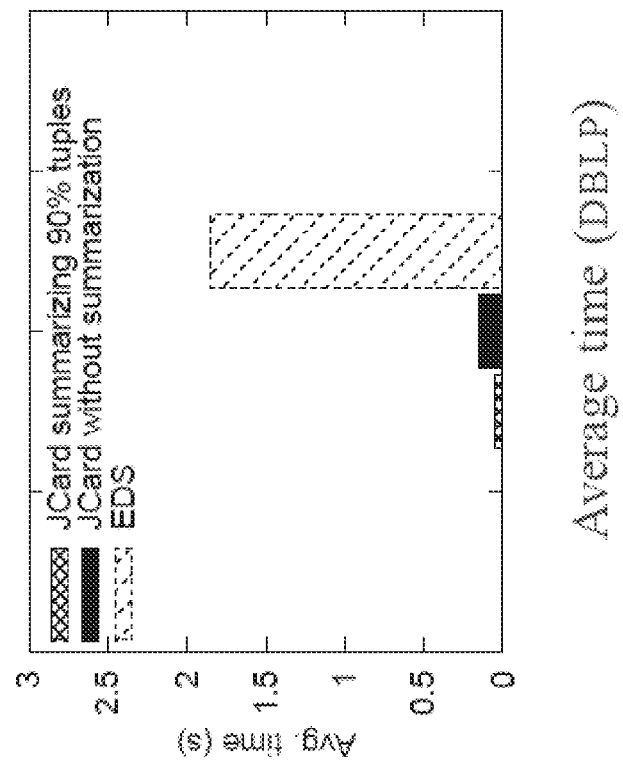
FIG. 13B shows the comparison result of the performance between the JCard in accordance with one embodiment of the present invention and the EDS method on a DBLP dataset.
Figure 13A:
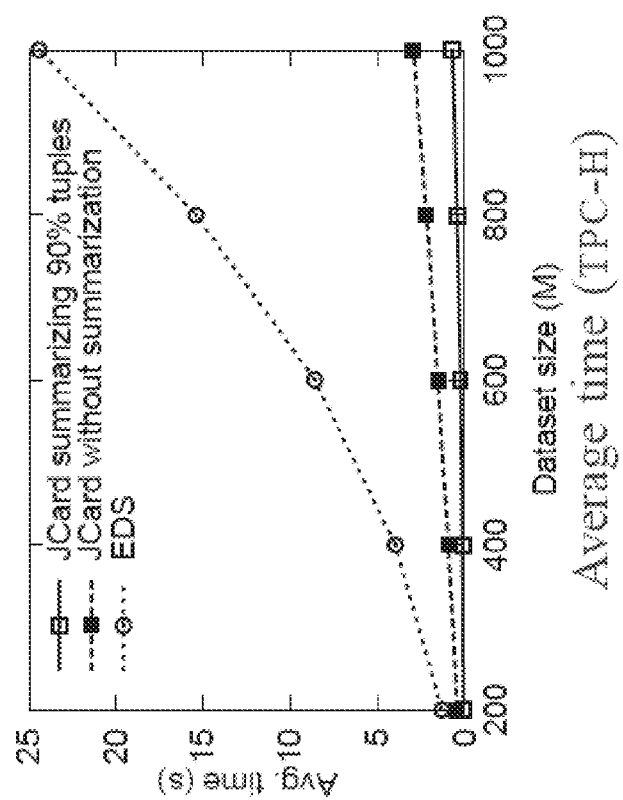
FIG. 13A shows the comparison result of the performance between the JCard in accordance with one embodiment of the present invention and the EDS method on a TPC-H dataset.

Next, the performances of JCard with implementation of the latest related work EDS technique are compared. Since EDS does not produce errors, herein reports its runtime in this experiment. For a fair comparison, it is also reported the runtime of an exact JCard (i.e., no tuple is summarized). In addition, it is observed that the JCard summarizing 90% tuples can still comfortably attain no error. Hence, it is reported the runtime of such a JCard, as a reference. FIG. 13A presents the runtime on TPC-H dataset and FIG. 13B presents the runtime on DBLP dataset, in one example of the present invention. In FIG. 13A, the x and y-axes are the dataset size and the runtime, respectively. From FIG. 13A, it is noted that the exact JCard is already at least one order of magnitude faster than EDS and the performance gap increases as the dataset size increases. It is observed similar to results in FIG. 13B.

A possible reason is that EDS is designed for the XML views, whose advantages cannot be fully observed from relational views. More specifically, in EDS, the values of EDS attributes of tuples can be updated without causing any side effect. An attribute is EDS if (I) its values do not appear in the XML view (i.e., the attribute is projected out); or (II) its values appear in the view only once and they are not accessed elsewhere in the XML view definition. XML uses sub-trees to naturally model one-to-many relationships such as the relationship between Person and In Proceedings in DBLP. In contrast, when encoded in relational views, both person and proceeding entities appear multiple times in the views. Due to Condition (II), most (if not all) attributes of the relational views are not EDS. As a result, costly update analysis is needed.

From the results shown in FIGS. 13A and 13B, it is also noted that the JCard summarizing 90% tuples is even faster.

Experiment C: Overall Performance of JCard

Figures 14A, 14B:
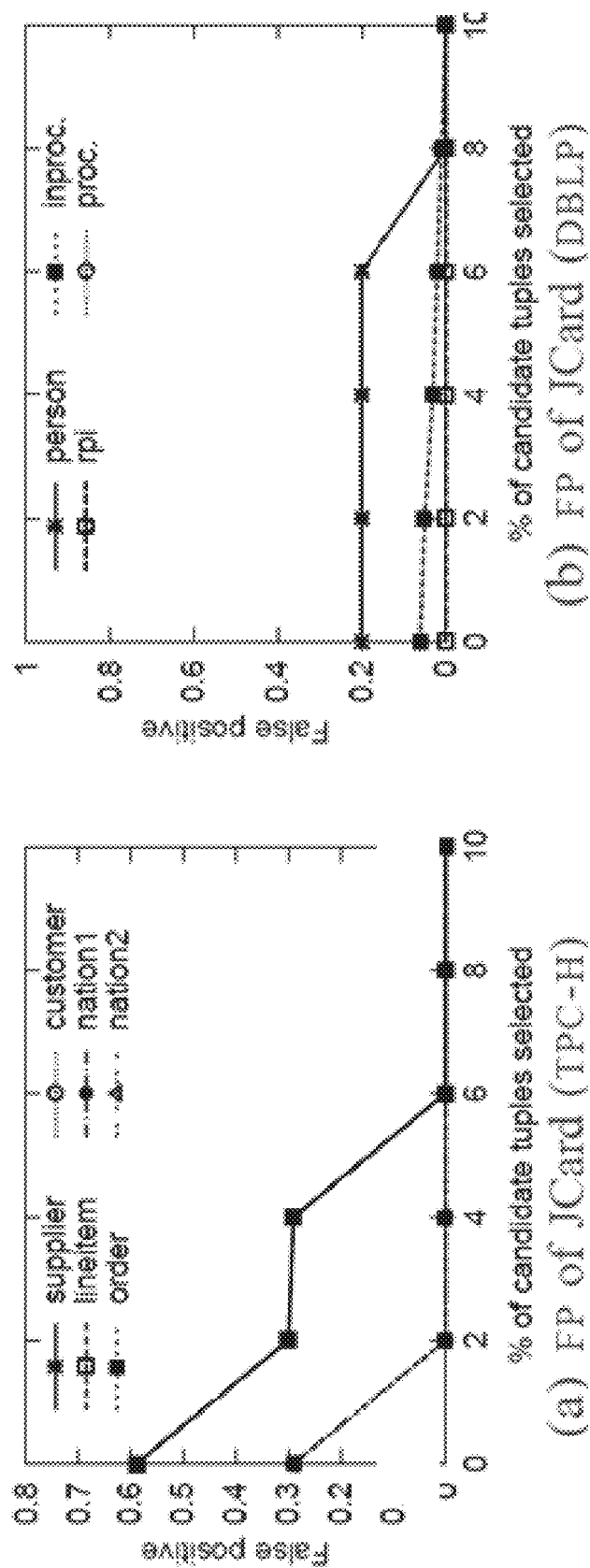
FIG. 14A shows the false positives in relation to the percentage of candidate tuples selected in TPC-H dataset in accordance with one embodiment of the present invention.
FIG. 14B shows the false positives in relation to the percentage of candidate tuples selected in DBLP dataset in accordance with one embodiment of the present invention.

Estimation error. Select x % candidate tuples and study the estimation error of JCard. Then the three datasets where $\theta=0.4$ are used. FIGS. 14A to 14C show, respectively, false positives (FPs—i.e., the real error of JCard) in relation to the percent of candidate tuples selected on TPC-H, DBLP, and Synthetic DB datasets. FIGS. 14A to 14C show that the selection of candidate tuples is effective in reducing the estimation error. In particular, FP reduces as selecting more candidate tuples. After a certain small percentage (e.g., 6% in FIG. 14A, 10% in FIG. 14B and 2% in FIG. 14C), FP approaches to zero. It is observed that similar results are obtained for false negatives—FN in FIGS. 14D to 14f, which respectively show false negatives in relation to the percent of candidate tuples selected on TPC-H, DBLP, and Synthetic DB datasets.

Figure 14D:
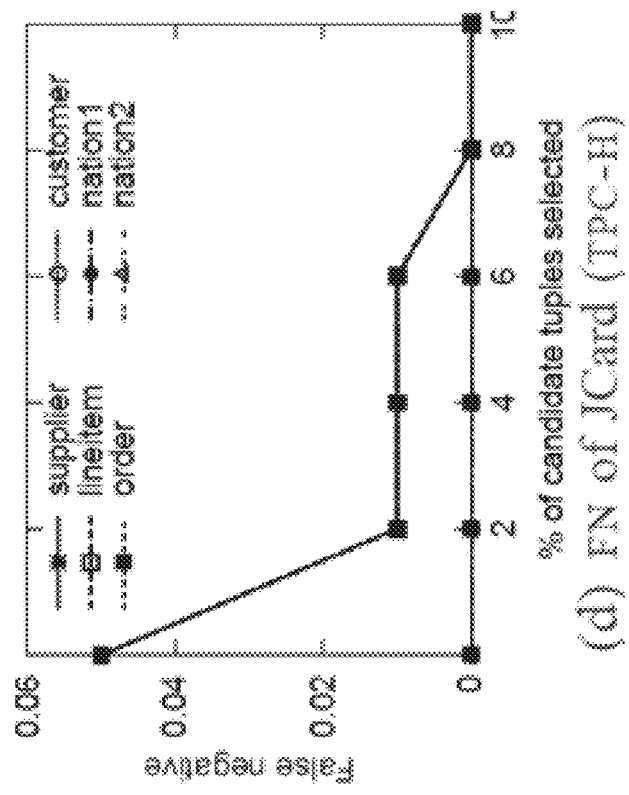
FIG. 14D shows the false negatives in relation to the percentage of candidate tuples selected in TPC-H dataset in accordance with one embodiment of the present invention.
Figure 14C:
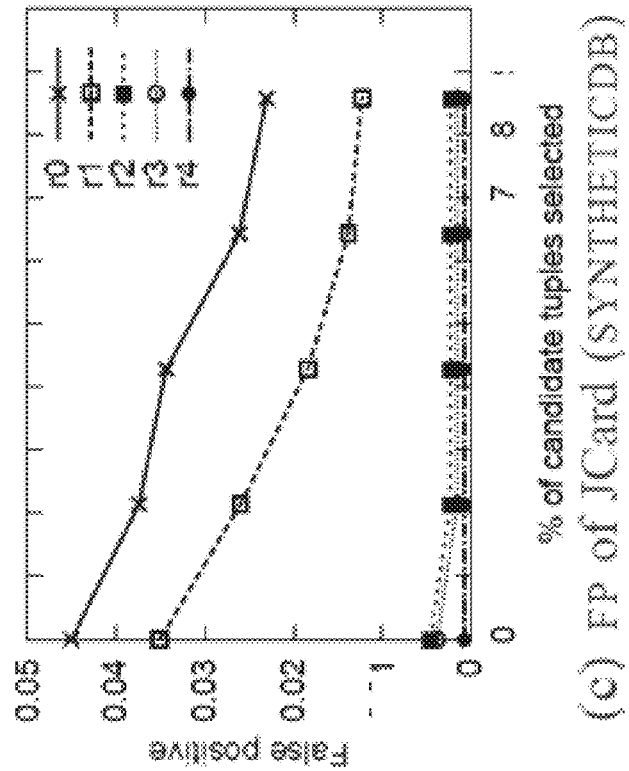
FIG. 14C shows the false positives in relation to the percentage of candidate tuples selected in Synthetic DB dataset in accordance with one embodiment of the present invention.
Figure 14F:
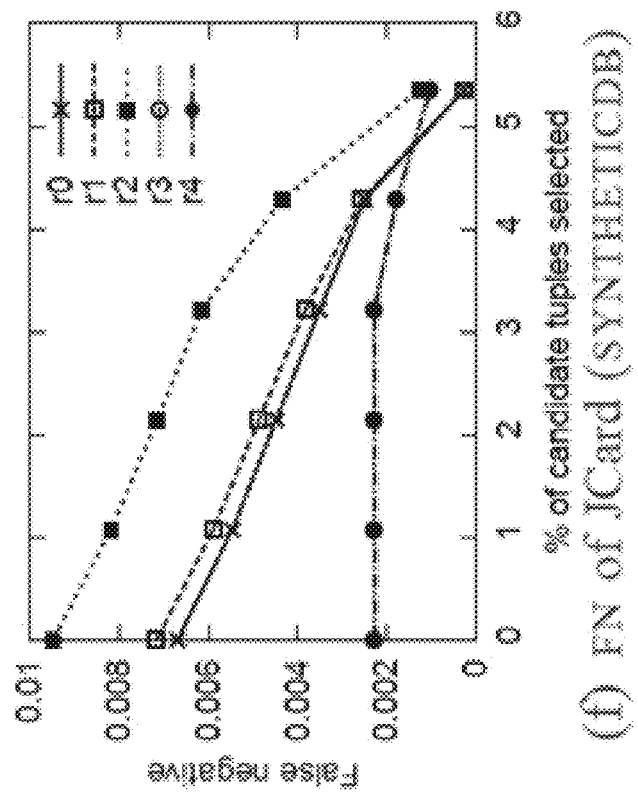
FIG. 14F shows the false negatives in relation to the percentage of candidate tuples selected in Synthetic DB dataset in accordance with one embodiment of the present invention.
Figure 14E:
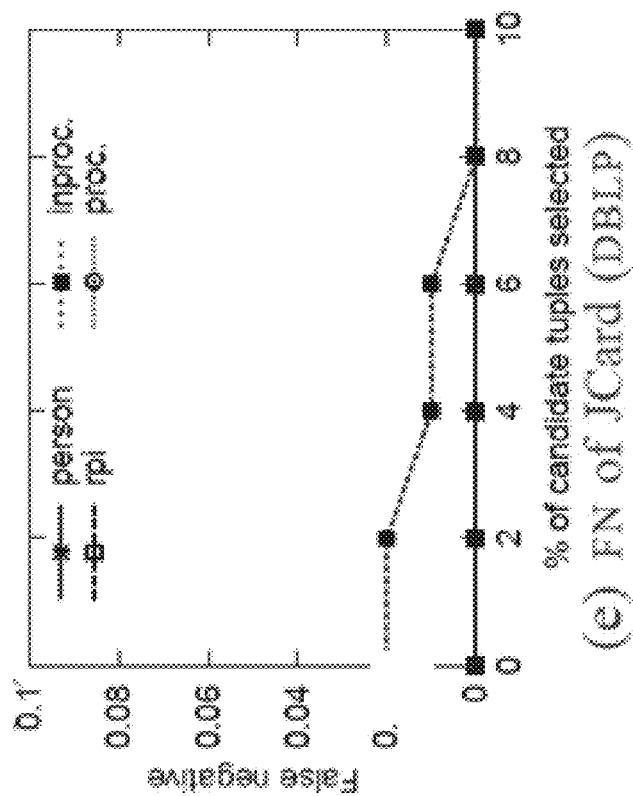
FIG. 14E shows the false negatives in relation to the percentage of candidate tuples selected in DBLP dataset in accordance with one embodiment of the present invention.

In addition, it is observed that if the optimal join tree is used, even no candidate tuple is selected, the estimation error of JCard can be zero as shown in FIGS. 14B, 14D and 14E.

Finally, the experiment verifies that the accuracies of JCard of different join trees are different, which is more notable on SYNTHETICDB, as shown in FIGS. 14C and 14F.

Figure 15B:
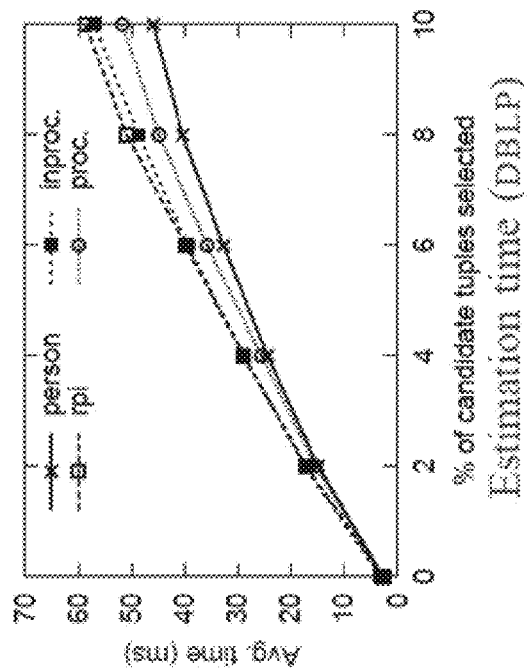
FIG. 15B shows the average estimation time in relation to the percentage of candidate tuples selected in DBLP dataset in accordance with one embodiment of the present invention.
Figure 15A:
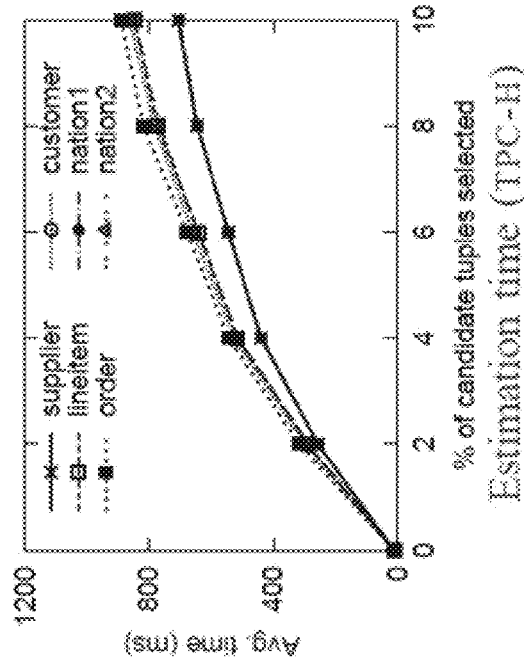
FIG. 15A shows the average estimation time in relation to the percentage of candidate tuples selected in TPC-H dataset in accordance with one embodiment of the present invention.
Figure 15D:
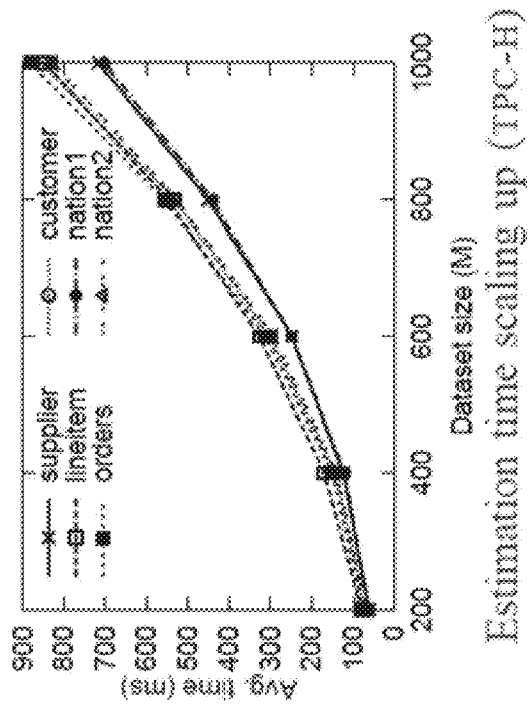
FIG. 15D shows the average estimation time in relation to the data set size in TPC-H dataset in one embodiment of the present invention.
Figure 15C:
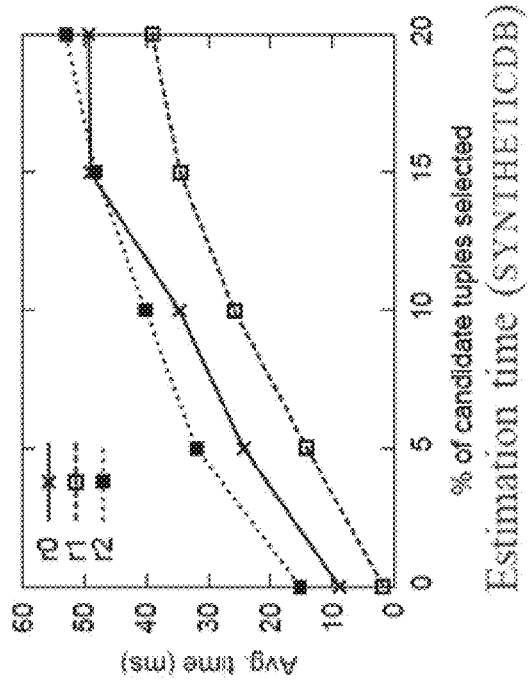
FIG. 15C shows the average estimation time in relation to the percentage of candidate tuples selected in Synthetic DB dataset in accordance with one embodiment of the present invention.

Detection time vs. estimation time. This is to compare the detection time of an exact JCard (i.e., no tuple is summarized) and the estimation time of JCards summarizing 1-x % tuples. The average detection time of TPC-H, DBLP and SYNTHETICDB is about 3 s, 0.18 s and 60 ms, respectively. Their average estimation time is reported in FIGS. 15A to 15C, respectively. FIGS. 15A to 15C show that the estimation in embodiments of the present invention is much faster than the detection. In particular, on TPC-H, when 6% candidate tuples are selected, FP is zero (FIG. 14A), but the estimation time is about 700 ms (FIG. 15A), which is about 4 times smaller than the detection time. This is because that the JCard summarizes about 90% non-candidate tuples in equivalence classes, which can clearly save the propagation time of join cardinalities. It is observed similar results on DBLP (FIG. 14B and FIG. 15B) and SYNTHETICDB (FIG. 14C and FIG. 15C).

Moreover, the estimation time increases roughly linearly with the percentage of candidate tuples selected. The "slope" is about 80 ms, 5 ms and 2 ms per 1% candidate tuples selected on TPC-H, DBLP and SYNTHETICDB, respectively.

Scalability test. The scalability of the JCard is tested by using TPC-H. In this experiment, the JCard is adjusted or tuned to be error free so as to focus on its estimation time. Specifically, select 10% candidate tuples and set $\theta=0.4$. (From FIGS. 14A and 14D, noting that the JCard is error free at such a setting.) The result is reported in FIG. 15D. From FIG. 15D, it is observed that the join trees have similar estimation time and the growth of time is almost linear as the dataset size increases. However, it is always much faster than the detection time as discussed.

Experiment D: Optimizations on JCard

In this experiment, only the results with TPC-H are presented as other datasets exhibit similar performance characteristics.

Effectiveness of equivalence classes. Previous experiments verify the importance of candidate tuples and this experiment shows the importance of equivalence classes, by skipping them. FIG. 16A reports the result. Consistent with the estimation with equivalence classes (FIG. 14D), the error reduces as select more candidate tuples. However, when comparing FIG. 14D and FIG. 16A, note that the equivalence classes sometimes offer more than an order of magnitudes improvement on accuracies.

This experiment can be modified to show the effectiveness of candidate tuple selection. FIG. 16A further shows that the candidate tuple selection in the embodiments of the present invention outperforms a random method. In particular, when 10% candidate tuples are selected, the present embodiment's FN is close to zero. When x=9%, the FN of the embodiments of the present invention is 3%, whereas that of the random method is 75%. FIG. 16A does not show FP as FP does not occur when equivalence classes are skipped.

Candidate tuple selection. To show the effectiveness of candidate tuple selection approach in some embodiments of the present invention, its FPs (the real error) is compared with the FPs of a random approach. Both approaches use equivalence classes. FIG. 16B shows that the technique in some embodiments of the present invention significantly outperforms the random approach. In particular, when x=2%, the FP of the present invention is zero, whereas FP of the latter is 0.29. Similar comparison results for FNs are obtained.

Join tree selection. Then tested the sampling-based join tree selection technique presented in an earlier section. Since FP is the real error of JCard, present the accumulated FP of 1,000 real-negative insertions in FIG. 16C. In this experiment, no candidate tuple is selected and $\theta$ is set to 0.4. First, with reference to FIG. 14A, note that the sampling technique produced the optimal join trees. Second, note that the estimation error converges quickly, i.e., after 700 sample insertions.

Experiment E: Deletions and Replacements

In this experiment, the performance of the support of deletions and replacements is tested and the results are reported in FIG. 17A. Since the error of replacements is identical to that of insertions (as discussed in Sec. 7), it is focused on the estimation time here. Selected 10% candidate tuples. FIG. 17A shows that the time overhead of deletions is tiny (e.g., 14.3 ms for the dataset of 1G bytes); and the replacement time is almost the same as the insertion time (FIG. 13A).

Experiment F: Projections

Next, the experimental results on views with projections are presented. SYNTHETICDB is used as it is easier to control. The experiment projects out some attributes of relations randomly, where the primary keys and the join attributes may be projected out.

Figure 17D:
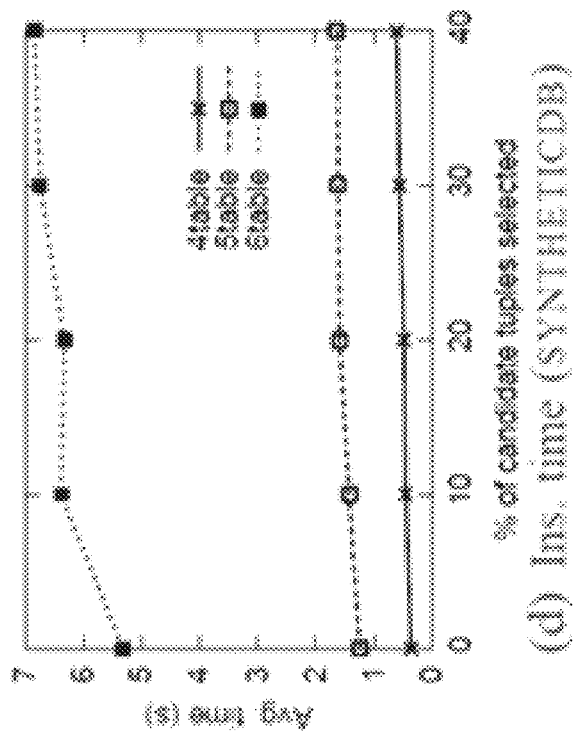
FIG. 17D shows the average insertion time in relation to the percentage of candidate tuples selected in Synthetic DB dataset in one embodiment of the present invention.
Figure 17C:
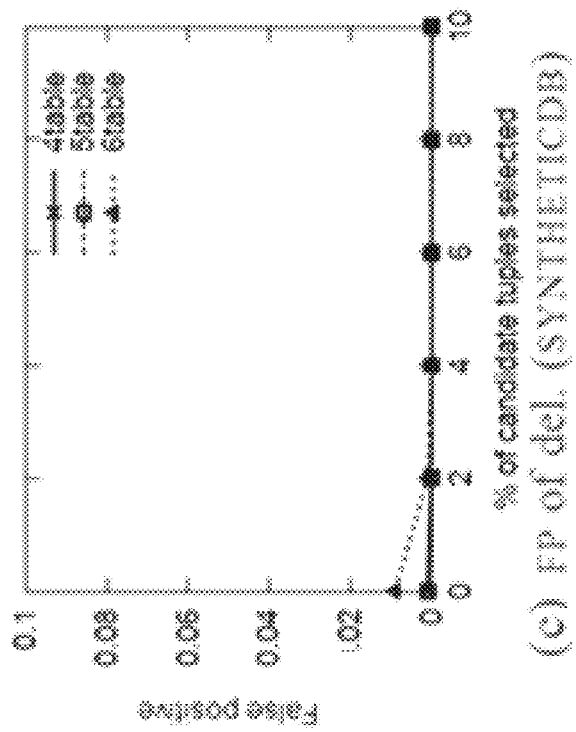
FIG. 17C shows the false positives of deletion in relation to the percentage of candidate tuples selected in Synthetic DB dataset in one embodiment of the present invention.

Estimation error. To study the performances of incorporating lineage technique into JCard, the number of relations of views is varied. FIGS. 17B and 17C present FPs of insertions and deletions of the current extended JCard, respectively. FIGS. 17B and 17C bshow that with more joins, FP increases rapidly, as it is harder to estimate join cardinalities accurately with more joins. However, FPs are well controlled under 6%. There is no FN due to the set semantics of projections.

Figures 17E, 17F:
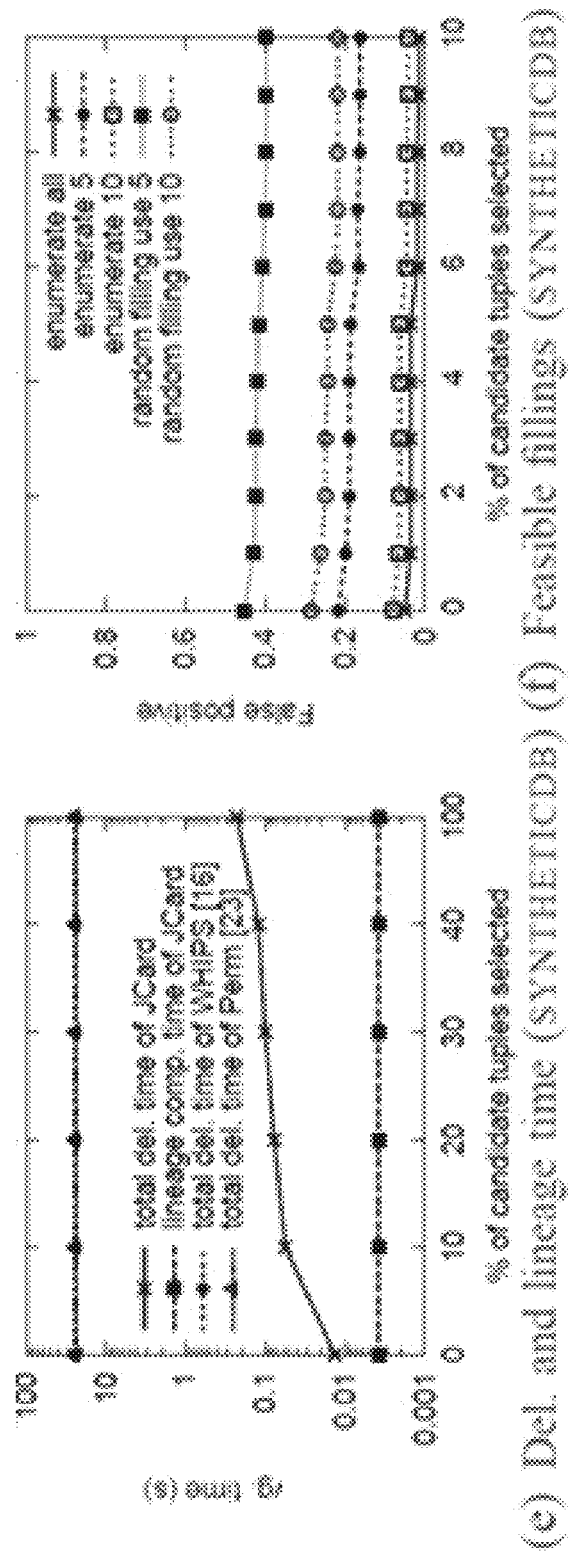
FIG. 17E shows the average deletion and lineage time in relation to the percentage of candidate tuples selected in Synthetic DB dataset in one embodiment of the present invention.
FIG. 17F shows the feasible fillings of false positive in relation to the percentage of candidate tuples selected in Synthetic DB dataset in one embodiment of the present invention.

Estimation time and lineage computation time. FIGS. 17D and 17E show the estimation time of JCards with x % candidate tuples on insertions and deletions, respectively. From FIG. 17D, it is observed that the estimation on views with projections takes longer time than that without projections (FIG. 15C). For example, when the views contains six relations and x=0, JCards for views without projections are roughly 300 times faster than those with projections. It is not surprising because propagating tuple values is more time-consuming than propagating counts. FIG. 17D also shows the estimation time of JCards on views having four and five relations. As expected, the estimation time increases rapidly as the number of relations increased. Importantly, the side-effect estimation times are significantly smaller than the translation time.

Further, a simple performance breakdown of total deletion time is presented. Set the view with four tables for simplicity and vary the percentage of candidate tuples. FIG. 17E shows that deletions always take less than 0.5 s. In addition, the lineage computation accounts for a small fraction of the total time (e.g., 6% of total time when x=10%).

Feasible filling. Finally, the current greedy approach with a random filling approach is tested and the results are shown in FIG. 17F. Also FP of enumerating all possible fillings is shown as a reference. FIG. 17F shows that when the number of feasible fillings k is fixed (e.g., k=5 or k=10), the current approach is clearly more accurate than the random approach.

In the disclosure of the present invention, there is proposed a data-oriented approach to provide practical support for the view update problem. Specifically, it is proposed a side-effect detector for SPJ views that estimates or detects whether a view update causes side effects and rejects untranslatable updates early, in turn avoiding costly update translations. The core of the detector was a novel structure—the update filter. In this disclosure, the update filter is a join cardinality summary JCard that consists of structures that summarize (extended) dangling tuples and the source of view tuples. JCard is derived from a notion of cardinality equivalence. The embodiments of the present invention proposed an estimation algorithm on JCard, and the extension of JCard to support projections. It is presented optimizations to construct an efficient and accurate JCard. Extensive experiments demonstrated that JCard could be tuned to be accurate on TPC-H, DBLP and the synthetic dataset devised by the inventor.

Contributions of the Embodiments of the Present Invention

1. In one embodiment, the present invention is advantageous in that it shows that KL divergence can serve as an upper bound of the estimation error of the proposed side-effect detector. Furthermore, the present invention is advantageous in that it revised the notion of errors of estimation.

2. An advantage of one embodiment of the present invention proposes a novel summary structure for the proposed side-effect detector, called Join Cardinality summary—JCard. At the core of JCard is the notion of cardinality equivalence of tuples. JCard comprises two structures: (i) database summaries and (ii) a set of candidate tuples. The embodiments also present the construction of JCard and side-effect estimation algorithms.

3. Embodiments of the present invention may also propose techniques to support side-effect estimations of insertions, deletions, and replacements on the SJ view. To support projections, the present invention proposed an extension of JCard based on value-cardinality equivalence.

4. Embodiments of the present invention may also formally define two optimization problems in JCard construction, and propose a heuristic and a sampling solution to these problems, respectively. In particular, (i) the embodiments of the present invention established that the candidate tuple selection problem is equivalent to the Minimum Set Cover (MSC) problem. It is therefore logical to adopt heuristics for MSC to address the present problem. (ii) To determine the optimal representation of a view definition, the embodiments of the present invention employs a simple sampling technique (e.g, estimation of proportion) to quantify the estimation error of view definition representations.

5. Embodiments of the present invention may also, through conducting a set of extensive experiments with synthetic and real datasets, verify the effectiveness and efficiency of the proposed techniques. The experiments show that the side-effect detector in the embodiments of the present invention can be easily tuned to be accurate.

INDUSTRIAL APPLICABILITY

The present invention relates to method of data-oriented approach to provide a practical support for view updates in database systems. In particular, the present invention provides a summarization of the source database of views that serves as an update filter that aims to efficiently reject untranslatable view updates by estimating the side effects of the updates, thereby avoiding costly translation analysis. In an embodiment of the present invention where estimation errors are not preferred, the update filter can be tuned to be exact. It is known in the art that database updates through views is a classical intractable problem but the present invention relates to method of data-oriented approach to provide a practical support for view updates in database systems wherein the update filters are efficient and can be easily tuned to produce accurate estimations. It has been thoroughly tested on TPC-H and DBLP.

If desired, the different functions discussed herein may be performed in a different order and/or concurrently with each other. Furthermore, if desired, one or more of the above-described functions may be optional or may be combined.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

While the foregoing invention has been described with respect to various embodiments and examples, it is understood that other embodiments are within the scope of the present invention as expressed in the following claims and their equivalents. Moreover, the above specific examples are to be construed as merely illustrative, and not limitative of the reminder of the disclosure in any way whatsoever. Without further elaboration, it is believed that one skilled in the art can, based on the description herein, utilize the present invention to its fullest extent. All publications recited herein are hereby incorporated by reference in their entirety.

Citation or identification of any reference in this section or any other section of this document shall not be construed as an admission that such reference is available as prior art for the present application.

We claim:

1. A method for performing view updates in a database system, comprising the steps of:
   processing a plurality of source databases of views to generate at least one summarization of the plurality of source databases;
   receiving data associated with view updates for updating the views;
   estimating, using a join cardinality summary analysis, presence of one or more side effects associated with the view updates, wherein the one or more side effects will lead to changes not specified by the view updates; and
   translating the view updates that are estimated to be free of side effect for updating the plurality of source databases of views;
   identifying untranslatable view updates by processing the at least one summarization of the plurality of source databases; and
   preventing the untranslatable view updates from being performed;
   wherein the join cardinality summary analysis comprises:
     summarizing tuples of the plurality of source databases of views;
     processing the tuples based on join cardinality equivalence classes and a set of candidate view tuples to estimate change in view size associated with the view updates; and
     estimating the presence of one or more side effects associated with the view updates by comparing the estimated change in view size with a threshold for controlling estimation error.

2. The method according to claim 1 wherein the at least one summarization of the plurality of source databases is arranged to serve as one or more update filters for preventing untranslatable view updates from being performed.

3. The method according to claim 2 wherein the one or more update filters are arranged to be adjusted to be free of estimation errors.

4. The method according to claim 1 wherein the estimation step further comprises processing one or more database schemas, and view definitions.

5. The method according to claim 1 wherein the method is arranged to be used in at least one of the following applications: data publishing, information dissemination, Extensible Markup Language or Resource Description Framework query rewriting, query optimization and tracing facility in peer-to-peer networks.

6. The method according to claim 1, further comprising the step of: inserting tuples of the views.

7. The method according to claim 1, further comprising the step of: deleting tuples of the views.

8. The method according to claim 1, further comprising the step of: replacing tuples of the views.

9. The method according to claim 1, wherein the threshold for controlling estimation error is adjustable for trading off estimation error for efficiency.

10. The method according to claim 1, further comprising updating one or more of the plurality of source databases of views based on the translated view updates.

11. A non-transitory computer readable medium for storing computer instructions that, when executed by one or more processors, causes the one or more processors to perform a method for performing view updates in a database system, the method comprising the steps of:
    processing a plurality of source databases of views to generate at least one summarization of the plurality of source databases;

receiving data associated with view updates for updating the views;

estimating, using a join cardinality summary analysis, presence of one or more side effects associated with the view updates, wherein the one or more side effects will lead to changes not specified by the view updates; and translating the view updates that are estimated to be free of side effect for updating the plurality of source databases of views;

identifying untranslatable view updates by processing the at least one summarization of the plurality of source databases; and preventing the untranslatable view updates from being performed;

wherein the join cardinality summary analysis comprises:
- summarizing tuples of the plurality of source databases of views;
- processing the tuples based on join cardinality equivalence classes and a set of candidate view tuples to estimate change in view size associated with the view updates; and
- estimating the presence of one or more side effects associated with the view updates by comparing the estimated change in view size with a threshold for controlling estimation error.

* * * * *